United States Patent
Zion et al.

(10) Patent No.: US 12,236,515 B2
(45) Date of Patent: Feb. 25, 2025

(54) SYSTEM AND METHOD FOR INTERACTIVE THREE- DIMENSIONAL PREVIEW

(71) Applicant: Apple Inc., Cupertino, CA (US)

(72) Inventors: Peter G. Zion, Lafayette, CO (US); Tyler L. Casella, Martinez, CA (US); Omar Shaik, Menlo Park, CA (US); Benjamin B. Loggins, San Francisco, CA (US); Eric S. Peyton, Naperville, IL (US); Christopher H. Dempsey, Erie, CO (US)

(73) Assignee: Apple Inc., Cupertino, CA (US)

( * ) Notice: Subject to any disclaimer, the term of this patent is extended or adjusted under 35 U.S.C. 154(b) by 6 days.

(21) Appl. No.: 17/814,455

(22) Filed: Jul. 22, 2022

(65) Prior Publication Data

US 2023/0030699 A1 Feb. 2, 2023

Related U.S. Application Data

(60) Provisional application No. 63/226,723, filed on Jul. 28, 2021.

(51) Int. Cl.
G06T 15/00 (2011.01)
G02B 27/01 (2006.01)
G06T 19/00 (2011.01)

(52) U.S. Cl.
CPC .......... G06T 15/005 (2013.01); G02B 27/017 (2013.01); G02B 27/0172 (2013.01);
(Continued)

(58) Field of Classification Search
CPC ............... G06T 15/005; G06T 2200/08; G06T 2200/24; G06T 2210/32; G02B 27/017; G02B 27/0172; G02B 2027/014
See application file for complete search history.

(56) References Cited

U.S. PATENT DOCUMENTS 5,015,188 A 5/1991 Pellosie et al.
5,809,267 A 9/1998 Moran et al.
(Continued)

FOREIGN PATENT DOCUMENTS

EP 3118722 A1 1/2017
GB 2540791 A 2/2017
(Continued)

OTHER PUBLICATIONS

Non-Final Office Action received for U.S. Appl. No. 17/812,965, mailed on Jun. 8, 2023, 8 pages.
(Continued)

*Primary Examiner* — Michelle Chin
(74) *Attorney, Agent, or Firm* — Kubota & Basol LLP

(57) ABSTRACT

Three-dimensional data can be synchronized between a first electronic device and a second electronic device. A content creation application may be running on the first electronic device and may utilize a data file describing a three-dimensional content item. A two-dimensional representation of the content item may be displayed on the first electronic device. A user may request to preview the two-dimensional representation of the content item in three-dimensions. The first electronic device may initiate a data transfer with the second electronic device. The three-dimensional data of the data file may be transferred, via a communication link, from the content creation of the first electronic device to a three-dimensional graphic rendering application at the second electronic device. The three-dimensional graphic rendering application may generate a preview of the content item in three-dimensions based on the received three-dimensional data.

20 Claims, 7 Drawing Sheets

(52) U.S. Cl.
CPC ...... *G06T 19/003* (2013.01); *G02B 2027/014* (2013.01); *G06T 2200/08* (2013.01); *G06T 2200/24* (2013.01); *G06T 2210/32* (2013.01)

(56) References Cited

U.S. PATENT DOCUMENTS

| | | | |
|---|---|---|---|
| 6,167,433 | A | 12/2000 | Maples et al. |
| 6,295,069 | B1 | 9/2001 | Shirur |
| 6,426,745 | B1 | 7/2002 | Isaacs et al. |
| 6,750,873 | B1 | 6/2004 | Bernardini et al. |
| 7,298,370 | B1 | 11/2007 | Middler et al. |
| 9,294,757 | B1 | 3/2016 | Lewis et al. |
| 9,298,334 | B1 | 3/2016 | Zimmerman et al. |
| 9,383,189 | B2 | 7/2016 | Bridges et al. |
| 9,396,580 | B1 | 7/2016 | Nowrouzezahrai et al. |
| 9,519,371 | B2 | 12/2016 | Nishida |
| 10,488,941 | B2 | 11/2019 | Lam et al. |
| 10,642,368 | B2 | 5/2020 | Chen |
| 10,664,043 | B2 | 5/2020 | Ikuta et al. |
| 10,671,241 | B1 | 6/2020 | Jia et al. |
| 10,691,216 | B2 | 6/2020 | Geisner et al. |
| 10,762,716 | B1 | 9/2020 | Paul et al. |
| 10,846,864 | B2 | 11/2020 | Kim et al. |
| 11,138,798 | B2 | 10/2021 | Paul et al. |
| 11,204,678 | B1 | 12/2021 | Baker et al. |
| 11,249,556 | B1 | 2/2022 | Schwarz et al. |
| 11,262,885 | B1 | 3/2022 | Burckel |
| 11,340,756 | B2 | 5/2022 | Faulkner et al. |
| 11,347,319 | B2 | 5/2022 | Goel et al. |
| 11,409,363 | B2 | 8/2022 | Chen et al. |
| 11,416,080 | B2 | 8/2022 | Heo et al. |
| 11,531,402 | B1 | 12/2022 | Stolzenberg |
| 11,531,459 | B2 | 12/2022 | Poupyrev et al. |
| 11,557,102 | B2 | 1/2023 | Palangie et al. |
| 11,615,596 | B2 | 3/2023 | Faulkner et al. |
| 11,641,460 | B1 | 5/2023 | Geusz et al. |
| 11,669,155 | B2 | 6/2023 | Bowman et al. |
| 11,762,473 | B2 | 9/2023 | Cipoletta et al. |
| 11,768,544 | B2 | 9/2023 | Schwarz et al. |
| 11,847,748 | B2 | 12/2023 | Liu et al. |
| 11,886,643 | B2 | 1/2024 | Irie et al. |
| 11,899,845 | B2 | 2/2024 | Chung et al. |
| 11,909,453 | B2 | 2/2024 | Javaudin et al. |
| 11,914,759 | B2 | 2/2024 | Klein et al. |
| 11,928,263 | B2 | 3/2024 | Jung et al. |
| 11,983,326 | B2 | 5/2024 | Lacey |
| 11,989,965 | B2 | 5/2024 | Tarighat Mehrabani |
| 12,032,803 | B2 | 7/2024 | Pastrana Vicente et al. |
| 2002/0030692 | A1 | 3/2002 | Griesert |
| 2005/0062738 | A1 | 3/2005 | Handley et al. |
| 2005/0248299 | A1 | 11/2005 | Chemel et al. |
| 2010/0302245 | A1 | 12/2010 | Best |
| 2011/0142321 | A1 | 6/2011 | Huffman |
| 2012/0113223 | A1 | 5/2012 | Hilliges et al. |
| 2012/0170089 | A1 | 7/2012 | Kim et al. |
| 2012/0249741 | A1 | 10/2012 | Maciocci et al. |
| 2013/0222227 | A1* | 8/2013 | Johansson ............... H04L 67/10 345/156 |
| 2013/0321462 | A1* | 12/2013 | Salter ..................... G06F 1/163 345/633 |
| 2013/0332890 | A1* | 12/2013 | Ramic ................. G06F 3/04815 715/852 |
| 2014/0040832 | A1 | 2/2014 | Regelous |
| 2014/0078176 | A1 | 3/2014 | Kim et al. |
| 2014/0104206 | A1 | 4/2014 | Anderson |
| 2014/0129990 | A1 | 5/2014 | Xin et al. |
| 2014/0333666 | A1 | 11/2014 | Poulos et al. |
| 2014/0368620 | A1 | 12/2014 | Li et al. |
| 2015/0067580 | A1 | 3/2015 | Um et al. |
| 2015/0121466 | A1 | 4/2015 | Brands et al. |
| 2015/0123901 | A1 | 5/2015 | Schwesinger et al. |
| 2015/0153833 | A1 | 6/2015 | Pinault et al. |
| 2015/0317831 | A1 | 11/2015 | Ebstyne et al. |
| 2015/0331576 | A1 | 11/2015 | Piya et al. |
| 2016/0098093 | A1 | 4/2016 | Cheon et al. |
| 2016/0189426 | A1 | 6/2016 | Thomas et al. |
| 2016/0225164 | A1 | 8/2016 | Tomlin et al. |
| 2016/0291922 | A1 | 10/2016 | Montgomerie et al. |
| 2017/0032568 | A1 | 2/2017 | Gharpure et al. |
| 2017/0052595 | A1 | 2/2017 | Poulos et al. |
| 2017/0053383 | A1 | 2/2017 | Heo |
| 2017/0178392 | A1 | 6/2017 | Zuccarino et al. |
| 2017/0213388 | A1 | 7/2017 | Margolis et al. |
| 2017/0221264 | A1 | 8/2017 | Perry |
| 2017/0243352 | A1 | 8/2017 | Kutliroff et al. |
| 2017/0251143 | A1 | 8/2017 | Peruch et al. |
| 2017/0270715 | A1 | 9/2017 | Lindsay et al. |
| 2017/0287215 | A1 | 10/2017 | Lalonde et al. |
| 2017/0287225 | A1 | 10/2017 | Powderly et al. |
| 2017/0351094 | A1 | 12/2017 | Poulos et al. |
| 2018/0005433 | A1 | 1/2018 | Kohler et al. |
| 2018/0088787 | A1 | 3/2018 | Bereza et al. |
| 2018/0103209 | A1 | 4/2018 | Fischler et al. |
| 2018/0122138 | A1 | 5/2018 | Piya et al. |
| 2018/0130255 | A1 | 5/2018 | Hazeghi et al. |
| 2018/0143693 | A1 | 5/2018 | Calabrese et al. |
| 2018/0173404 | A1 | 6/2018 | Smith |
| 2018/0197341 | A1 | 7/2018 | Loberg et al. |
| 2018/0348986 | A1 | 12/2018 | Sawaki |
| 2019/0018479 | A1 | 1/2019 | Minami |
| 2019/0018498 | A1 | 1/2019 | West et al. |
| 2019/0050062 | A1 | 2/2019 | Chen et al. |
| 2019/0130622 | A1 | 5/2019 | Hoover et al. |
| 2019/0155495 | A1 | 5/2019 | Klein et al. |
| 2019/0164340 | A1 | 5/2019 | Pejic et al. |
| 2019/0228589 | A1 | 7/2019 | Dascola et al. |
| 2019/0340832 | A1 | 11/2019 | Srinivasan et al. |
| 2019/0349575 | A1 | 11/2019 | Knepper et al. |
| 2019/0362557 | A1 | 11/2019 | Lacey et al. |
| 2020/0005539 | A1 | 1/2020 | Hwang et al. |
| 2020/0045249 | A1 | 2/2020 | Francois et al. |
| 2020/0048825 | A1* | 2/2020 | Schultz ............... D06B 11/0096 |
| 2020/0128227 | A1 | 4/2020 | Chavez et al. |
| 2020/0135141 | A1 | 4/2020 | Day et al. |
| 2020/0214682 | A1 | 7/2020 | Zaslavsky et al. |
| 2020/0286299 | A1 | 9/2020 | Wang et al. |
| 2020/0379626 | A1 | 12/2020 | Guyomard et al. |
| 2021/0034163 | A1 | 2/2021 | Goel et al. |
| 2021/0034319 | A1 | 2/2021 | Wang et al. |
| 2021/0225043 | A1 | 7/2021 | Tang et al. |
| 2021/0241483 | A1 | 8/2021 | Dryer et al. |
| 2021/0279967 | A1 | 9/2021 | Gernoth et al. |
| 2021/0295592 | A1 | 9/2021 | Von Cramon |
| 2021/0374221 | A1 | 12/2021 | Markhasin et al. |
| 2021/0383097 | A1 | 12/2021 | Guerard et al. |
| 2022/0083145 | A1 | 3/2022 | Matsunaga et al. |
| 2022/0084279 | A1 | 3/2022 | Lindmeier et al. |
| 2022/0121344 | A1 | 4/2022 | Pastrana Vicente et al. |
| 2022/0148257 | A1 | 5/2022 | Boubekeur et al. |
| 2022/0253136 | A1 | 8/2022 | Holder et al. |
| 2022/0317776 | A1 | 10/2022 | Sundstrom et al. |
| 2022/0326837 | A1 | 10/2022 | Dessero et al. |
| 2022/0335697 | A1 | 10/2022 | Harding et al. |
| 2022/0382385 | A1 | 12/2022 | Chen et al. |
| 2022/0397962 | A1 | 12/2022 | Goel et al. |
| 2022/0408164 | A1 | 12/2022 | Lee et al. |
| 2022/0413691 | A1 | 12/2022 | Becker et al. |
| 2022/0414975 | A1 | 12/2022 | Becker et al. |
| 2022/0415094 | A1 | 12/2022 | Kim et al. |
| 2023/0027040 | A1 | 1/2023 | Wang et al. |
| 2023/0031832 | A1 | 2/2023 | Lipton et al. |
| 2023/0032771 | A1 | 2/2023 | Zion et al. |
| 2023/0076326 | A1 | 3/2023 | Xu et al. |
| 2023/0103161 | A1 | 3/2023 | Li et al. |
| 2023/0119162 | A1 | 4/2023 | Lipton et al. |
| 2023/0152935 | A1 | 5/2023 | McKenzie et al. |
| 2023/0168745 | A1 | 6/2023 | Yoda |
| 2023/0290042 | A1 | 9/2023 | Casella et al. |
| 2023/0377259 | A1 | 11/2023 | Becker et al. |
| 2023/0377299 | A1 | 11/2023 | Becker et al. |
| 2023/0377300 | A1 | 11/2023 | Becker et al. |
| 2024/0037886 | A1 | 2/2024 | Chiu et al. |
| 2024/0103636 | A1 | 3/2024 | Lindmeier et al. |

(56) References Cited

U.S. PATENT DOCUMENTS

| | | |
|---|---|---|
| 2024/0104875 A1 | 3/2024 | Couche et al. |
| 2024/0104876 A1 | 3/2024 | Couche et al. |
| 2024/0233097 A1 | 7/2024 | Ngo et al. |

FOREIGN PATENT DOCUMENTS

| | | |
|---|---|---|
| WO | 2019/172678 A1 | 9/2019 |
| WO | 2019/213111 A1 | 11/2019 |
| WO | 2022/147146 A1 | 7/2022 |

OTHER PUBLICATIONS

Search Report received for United Kingdom Patent Application No. GB2210885.6, mailed on Jan. 27, 2023, 1 page.
Adding Environments, Available online at: https://manual.keyshot.com/manual/environments/adding-environments/, [retrieved on Jun. 9, 2023], 2 pages.
Area Light, Available online at: https://manual.keyshot.com/manual/materials/material-types/light-sources/area-light/, [retrieved on Jun. 9, 2023], 24 pages.
Artec Leo Full 3D Scanning Demo w/ Sample Data, Digitize Designs, LLC, Available online at: <https://www.youtube.com/watch?v=ecBKo_h3Pug>, [retrieved on Sep. 1, 2022], Feb. 22, 2019, 3 pages.
Ex Parte Quayle Action received for U.S. Appl. No. 17/655,347, mailed on Jul. 8, 2024, 6 pages.
Feature Highlights, Available online at: https://manual.keyshot.com/manual/whats-new/feature-highlights/, [retrieved on Jun. 9, 2023], 28 pages.
Final Office Action received for U.S. Appl. No. 17/469,788, mailed on Nov. 16, 2023, 24 pages.
Final Office Action received for U.S. Appl. No. 17/807,226, mailed on Nov. 30, 2023, 23 pages.
Final Office Action received for U.S. Appl. No. 17/812,965, mailed on Jan. 31, 2024, 9 pages.
International Search Report received for PCT Patent Application No. PCT/US2021/049520, mailed on Apr. 8, 2022, 8 pages.
International Search Report received for PCT Patent Application No. PCT/US2022/071208, mailed on Aug. 18, 2022, 9 pages.
International Search Report received for PCT Patent Application No. PCT/US2023/074955, mailed on Feb. 1, 2024, 6 pages.
Light Manager, Available online at: https://manual.keyshot.com/manual/lighting/lighting-manager/, [retrieved on Jun. 9, 2023], 3 pages.
Non-Final Office Action received for U.S. Appl. No. 17/469,788, mailed on Mar. 2, 2023, 22 pages.
Non-Final Office Action received for U.S. Appl. No. 17/469,788, mailed on Mar. 21, 2024, 24 pages.
Non-Final Office Action received for U.S. Appl. No. 17/807,226, mailed on Jun. 26, 2023, 21 pages.
Non-Final Office Action received for U.S. Appl. No. 17/814,462, mailed on Feb. 1, 2024, 30 pages.
Non-Final Office Action received for U.S. Appl. No. 17/905,483, mailed on Mar. 27, 2024, 16 pages.
Non-Final Office Action received for U.S. Appl. No. 18/317,893, mailed on Apr. 25, 2024, 18 pages.
Notice of Allowance received for U.S. Appl. No. 17/807,226, mailed on Jul. 3, 2024, 9 pages.
Notice of Allowance received for U.S. Appl. No. 17/807,236, mailed on Feb. 5, 2024, 13 pages.
Notice of Allowance received for U.S. Appl. No. 17/807,236, mailed on Jul. 10, 2024, 9 pages.
Notice of Allowance received for U.S. Appl. No. 18/317,893, mailed on Mar. 6, 2024, 8 pages.
Notice of Allowance received for U.S. Appl. No. 18/317,893, mailed on Nov. 22, 2023, 9 pages.
Restriction Requirement received for U.S. Appl. No. 17/905,483, mailed on Dec. 7, 2023, 7 pages.
Cas and Chary XR, "Oculus Go & Your Phone As 2nd Controller!!—An Inexpensive Way To Play PC VR Games", posted on Mar. 8, 2019, https://www.youtube.com/watch?v=i_iRVa0kemw, 2019, 4 pages.
Gamedbharat, "I Want to Rotate a Object on Double Tap, Can Any One Help Me With This?", posted on Jul. 26, 2017, https://discussions.unity.com/t/i-want-to-rotate-a-object-on-double-tap-can-any-one-help-me-with-this/192010, 2017, 3 pages.
Locher et al., "Mobile Phone and Cloud—a Dream Team for 3D Reconstruction", 2016 IEEE Winter Conference on Applications of Computer Vision (WACV), 2016, pp. 1-8.
Ro et al., "AR Pointer: Advanced Ray-Casting Interface Using Laser Pointer Metaphor for Object Manipulation in 3D Augmented Reality Environment", Applied Sciences, vol. 9, No. 3078, [retrieved on Jul. 27, 2020], Jul. 30, 2019, 18 pages.
Slambekova, Dana, "Gaze and Gesture Based Object Interaction in Virtual World", [retrieved on Dec. 17, 2015]. Retrieved from the Internet: <URL:https://www.cs.rit.edu/~dxs4659/Report.pdf>, May 31, 2012, 54 pages.
Notice of Allowance received for U.S. Appl. No. 17/407,675, mailed on Aug. 20, 2024, 7 pages.
Notice of Allowance received for U.S. Appl. No. 17/812,965, mailed on Jul. 26, 2024, 6 pages.
Notice of Allowance received for U.S. Appl. No. 18/473,180, mailed on Aug. 22, 2024, 13 pages.

\* cited by examiner

SYSTEM AND METHOD FOR INTERACTIVE THREE-DIMENSIONAL PREVIEW

CROSS-REFERENCE TO RELATED APPLICATIONS

This application claims the benefit of U.S. Provisional Application No. 63/226,723, filed Jul. 28, 2021, the content of which is incorporated herein by reference in its entirety for all purposes.

FIELD OF THE DISCLOSURE

This relates generally to systems and methods for generating a preview of content in three dimensions, and particularly to systems and methods for generating and updating a preview of content in three dimensions using an application running on an electronic device

BACKGROUND OF THE DISCLOSURE

Some computer graphical environments provide two-dimensional and/or three-dimensional environments where at least some objects displayed for a user's viewing are virtual and generated by a computer. In some uses, a user may create or modify XR environments, such as by editing, generating, or otherwise manipulating XR virtual objects using a content generation environment, such as a graphics editor or graphics editing interface running on a content creation application, for example. In some embodiments, creation or modification of XR environments, including content items (e.g., two-dimensional and/or three-dimensional objects) within the XR environments, may include generating and presenting, to the user, a preview of the content items at various intermediate stages of the content creation process. However, such previews of content items that are generated and presented to the user in two-dimensions are limited by the two-dimensional display and graphics processing characteristics of the device on which the content creation application runs.

SUMMARY OF THE DISCLOSURE

Some embodiments of the disclosure are directed to a first electronic device in communication with a second electronic device, where the first electronic device and the second electronic device are configured to exchange data (e.g., extended reality (XR) content data) therebetween. In some embodiments, a first electronic device may be configured with a content creation application. The content creation application can be used to create XR content (also referred to herein as XR content item(s)) and can be used to present a two-dimensional representation of the three-dimensional XR content. In some embodiments, a second electronic device may be configured with a three-dimensional graphic rendering application. The three-dimensional graphic rendering application can be used to display a three-dimensional preview of three-dimensional XR content created using the content creation application at the first electronic device. The content creation application may form a communication link with the three-dimensional graphic rendering application, such that the two-dimensional XR content displayed on the first electronic device may be presented as a three-dimensional preview on the second electronic device. In some embodiments, the communication link may comprise one or more intermediaries (e.g., one or more supporting applications) running on the first electronic device and/or the second electronic device. In some embodiments, the content creation application and the three-dimensional graphic rendering application may be provided within a single electronic device.

Some embodiments of the disclosure are directed to the synchronization of three-dimensional data between a first electronic device and a second electronic device (e.g., a computer and a head-mounted display, respectively). A content creation application may be running on the first electronic device and may utilize a data file describing a three-dimensional content item. The data file describing the content item may be launched in the content creation application using a communication link between the content creation application and an integrated design environment. In some embodiments, a two-dimensional representation of the content item may be displayed on the first electronic device. In some embodiments, the data file may be edited while running on the content creation application. In some embodiments, the user may request (e.g., using the first electronic device) to preview the two-dimensional representation of the content item in three-dimensions. The first electronic device may initiate a data transfer with the second electronic device (e.g., in response to the request). In some embodiments, the three-dimensional data of the data file may be transferred to a first intermediary application running on the second electronic device. The first intermediary application may launch a second intermediary application in communication with the first intermediary application via a communication link. The second intermediary application can transfer user code of the data file to a three-dimensional graphic rendering application using a communication link. In some embodiments, the three-dimensional graphic rendering application may receive a request to generate content from the preview agent application, and generate a virtual object in three-dimensions. The three-dimensional virtual object can be presented to the user as a three-dimensional or two-dimensional representation. The three-dimensional preview of the content item may be displayed on the second electronic device as a three-dimensional content item rendered in a three-dimensional XR environment. The three-dimensional graphic rendering of the content item can be concurrently presented as a two-dimensional representation of the content item displayed on the first electronic device (e.g., having a two-dimensional display).

Some embodiments of the disclosure are directed to user-interactions with and/or manipulations of a three-dimensional preview displayed on an electronic device. In some embodiments, a two-dimensional representation of an XR content item displayed on a first electronic device may be concurrently displayed with a three-dimensional preview of the XR content item on a second electronic device. In some embodiments, user interactions (e.g., user input, such as touch, tap, motion, reorientation, etc.) with the three-dimensional preview of the XR content item received at the second electronic device may cause the display of the three-dimensional preview of the XR content item to be updated according to the input. In some embodiments, the user interactions with the three-dimensional preview of the XR content item received at the second electronic device many cause the display of the two-dimensional representation of the XR content item to be updated at the first electronic device according to the input. In some embodiments, the user input received at the second electronic device is communicated to the first electronic device in real time (e.g., in less than a threshold amount of time), such that the displays of the two-dimensional representation of the XR content item and the three-dimensional preview of the XR content item are optionally updated concurrently or nearly concurrently (e.g., within less than 50 ms of one another). The full descriptions of these embodiments are provided in the Drawings and the Detailed Description, and it is understood that this Summary does not limit the scope of the disclosure in any way.

BRIEF DESCRIPTION OF THE DRAWINGS

For a better understanding of the various described embodiments, reference should be made to the Detailed Description below, in conjunction with the following drawings in which like reference numerals often refer to corresponding parts throughout the figures.

DETAILED DESCRIPTION

Figure 1:
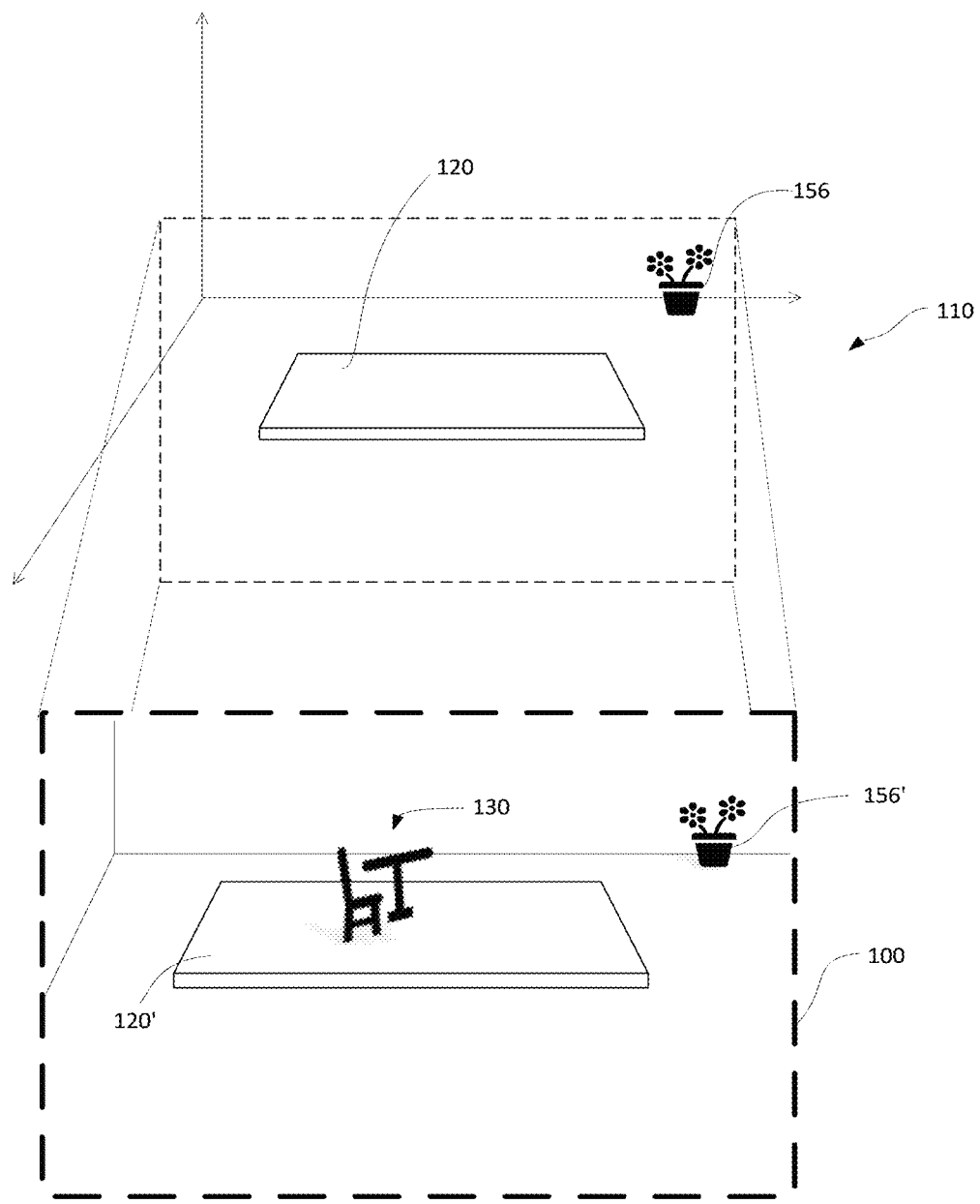
FIG. 1 illustrates an electronic device displaying an extended reality environment according to embodiments of the disclosure.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. As another example, the XR system may detect an interaction (e.g., a (virtual) touch, tap, pinch, etc.) with one or more objects in the XR environment, and, in response, adjust and/or update graphical content presented to the person in a manner similar to how such objects or views of such objects would change in a physical environment. In some embodiments, the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems (including hologram-based systems), heads-up displays (HUDs), head mounted displays (HMDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In some embodiments, XR content can be presented to the user via an XR data file (data file) (including script, executable code, etc.) that includes data representing the XR content and/or data describing how the XR content is to be presented. In some embodiments, the XR file includes data representing one or more XR scenes and one or more triggers for presentation of the one or more XR scenes. For example, an XR scene may be anchored to a horizontal, planar surface, such that when a horizontal, planar surface is detected (e.g., in the field of view of one or more cameras), the XR scene can be presented. The XR file can also include data regarding one or more virtual objects associated with the XR scene, and/or associated triggers and actions involving the XR virtual objects.

In order to simplify the generation of XR files and/or editing of computer-generated graphics generally, a content creation application including a content generation environment (e.g., an authoring environment GUI) can be used. In some embodiments, a content generation environment is itself an XR environment (e.g., a two-dimensional and/or three-dimensional environment). For example, a content generation environment can include one or more virtual objects and one or more representations of real-world objects. In some embodiments, the virtual objects are superimposed over a physical environment, or a representation thereof. In some embodiments, the physical environment is captured via one or more cameras of the electronic device and is actively displayed in the XR environment (e.g., via the display generation component). In some embodiments, the physical environment is (e.g., passively) provided by the electronic device, for example, if the display generation component includes a translucent or transparent element through which the user is able to see the physical environment.

In such a content generation environment, a user can create virtual objects from scratch (including the appearance of the virtual objects, behaviors/actions of the virtual objects, and/or triggers for the behaviors/actions of the virtual objects). Additionally or alternatively, virtual objects can be created by other content creators and imported into the content generation environment, where the virtual objects can be placed into an XR environment or scene. In some embodiments, virtual objects generated in a content generation environment or entire environments can be exported to other environments or XR scenes (e.g., via generating an XR file and importing or opening the XR file in a content creation application or XR viewer application).

Some embodiments of the disclosure are directed to a first electronic device in communication with a second electronic device, where the first electronic device and the second electronic device are configured to exchange data (e.g., XR content data) therebetween. In some embodiments, a first electronic device may be configured with a content creation application via which to create XR content (also referred to herein as XR content item(s)), where the content creation application includes a two-dimensional representation of the XR content. In some embodiments, a second electronic device may be configured with a three-dimensional graphic rendering application via which to display a three-dimensional preview of XR content created via the content creation application of the first electronic device. The content creation application may form a communication link with the three-dimensional graphic rendering application, such that the two-dimensional XR content displayed on the first electronic device may be presented as a three-dimensional preview on the second electronic device. In some embodiments, the communication link may comprise one or more intermediaries (e.g., one or more supporting applications) running one either or both of the first electronic device and the second electronic device. In some embodiments, the content creation application and the three-dimensional graphic rendering application may be provided within a single electronic device.

Some embodiments of the disclosure are directed to the synchronization of three-dimensional data between a first electronic device and a second electronic device (e.g., a computer and a head-mounted display, respectively). A content creation application may be running on the first electronic device and may utilize a data file describing a three-dimensional content item. The data file describing the content item may be launched in the content creation application using a communication link between the content creation application and an integrated design environment. In some embodiments, a two-dimensional representation of the content item may be displayed on the first electronic device. In some embodiments, the data file may be edited while running on the content creation application. In some embodiments, the user may request (e.g., using the first electronic device) to preview the two-dimensional representation of the content item in three-dimensions. The first electronic device may initiate a data transfer with the second electronic device (e.g., in response to the request). In some embodiments, the three-dimensional data of the data file may be transferred to a first intermediary application running on the second electronic device. The first intermediary application may launch a second intermediary application in communication with the first intermediary application via a communication link. The second intermediary application can transfer user code of the data file to a three-dimensional graphic rendering application using a communication link. In some embodiments, the three-dimensional graphic rendering application may receive a request to generate content from the preview agent application, and generate a virtual object in three-dimensions. The three-dimensional virtual object can be presented to the user as a three-dimensional or two-dimensional representation. The three-dimensional preview of the content item may be displayed on the second electronic device as a three-dimensional content item rendered in a three-dimensional XR environment. The three-dimensional graphic rendering of the content item can be concurrently presented as a two-dimensional representation of the content item displayed on the first electronic device (e.g., having a two-dimensional display).

Some embodiments of the disclosure are directed to user-interactions with and/or manipulations of a three-dimensional preview displayed on an electronic device. In some embodiments, a two-dimensional representation of an XR content item displayed on a first electronic device may be concurrently displayed with a three-dimensional preview of the XR content item on a second electronic device. In some embodiments, user interactions (e.g., user input, such as touch, tap, motion, reorientation, etc.) with the three-dimensional preview of the XR content item received at the second electronic device may cause the display of the three-dimensional preview of the XR content item to be updated according to the input. In some embodiments, the user interactions with the three-dimensional preview of the XR content item received at the second electronic device may cause the display of the two-dimensional representation of the XR content item to be updated at the first electronic device according to the input. In some embodiments, the user input received at the second electronic device is communicated to the first electronic device in real time (e.g., in less than a threshold amount of time), such that the displays of the two-dimensional representation of the XR content item and the three-dimensional preview of the XR content item are optionally updated concurrently or nearly concurrently (e.g., within less than 50 ms of one another). The full descriptions of these embodiments are provided in the Drawings and the Detailed Description, and it is understood that this Summary does not limit the scope of the disclosure in any way.

FIG. 1 illustrates an electronic device 100 displaying an XR environment (e.g., a computer-generated environment) according to embodiments of the disclosure. In some embodiments, electronic device 100 is a hand-held or mobile device, such as a tablet computer, laptop computer, smartphone, or head-mounted display. Examples of device 100 are described below with reference to the architecture block diagram of FIG. 2. As shown in FIG. 1, electronic device 100 and tabletop 120 are located in the physical environment 110. In some embodiments, electronic device 100 may be configured to capture areas of physical environment 110 including tabletop 120 and plant 156 (illustrated in the field of view of electronic device 100). In some embodiments, in response to a trigger, the electronic device 100 may be configured to display a virtual object 130 in the computer-generated environment (e.g., represented by a chair and table illustrated in FIG. 1) that is not present in the physical environment 110, but is displayed in the computer generated environment positioned on (e.g., anchored to) the top of a computer-generated representation 120' of real-world tabletop 120. For example, virtual object 130 can be displayed on the surface of the tabletop 120' in the computer-generated environment displayed via device 100 in response to detecting the planar surface of tabletop 120 in the physical environment 110. As shown in the example of FIG. 1, the computer-generated environment can include representations of additional real-world objects, such as a representation 156' of real-world plant 156. It should be understood that virtual object 130 is a representative virtual object and one or more different virtual objects (e.g., of various dimensionality such as two-dimensional or three-dimensional virtual objects) can be included and rendered in a three-dimensional computer-generated environment. For example, the virtual object can represent an application or a user interface displayed in the computer-generated environment. In some embodiments, the application or user interface can include the display of content items (e.g., photos, video, etc.) of a content application. In some embodiments, the virtual object is optionally configured to be interactive and respond to user input, such that a user may virtually touch, tap, move, rotate, or otherwise interact with, the virtual object. Additionally, it should be understood, that the 3D environment (or 3D virtual object) described herein may be a representation of a 3D environment (or three-dimensional virtual object) projected or presented at an electronic device.

In the discussion that follows, an electronic device that is in communication with a display generation component and one or more input devices is described. It should be understood that the electronic device optionally is in communication with one or more other physical user-interface devices, such as touch-sensitive surface, a physical keyboard, a mouse, a joystick, a hand tracking device, an eye tracking device, a stylus, etc. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device, or touch input received on the surface of a stylus) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application. Additionally, the device may support a content creation application for generating or editing content for computer generated graphics and/or XR environments (e.g., an application with a content generation environment). Additionally, the device may support a three-dimensional graphic rendering application for generating and displaying XR content and/or XR environments in three-dimensions.

Figure 2:
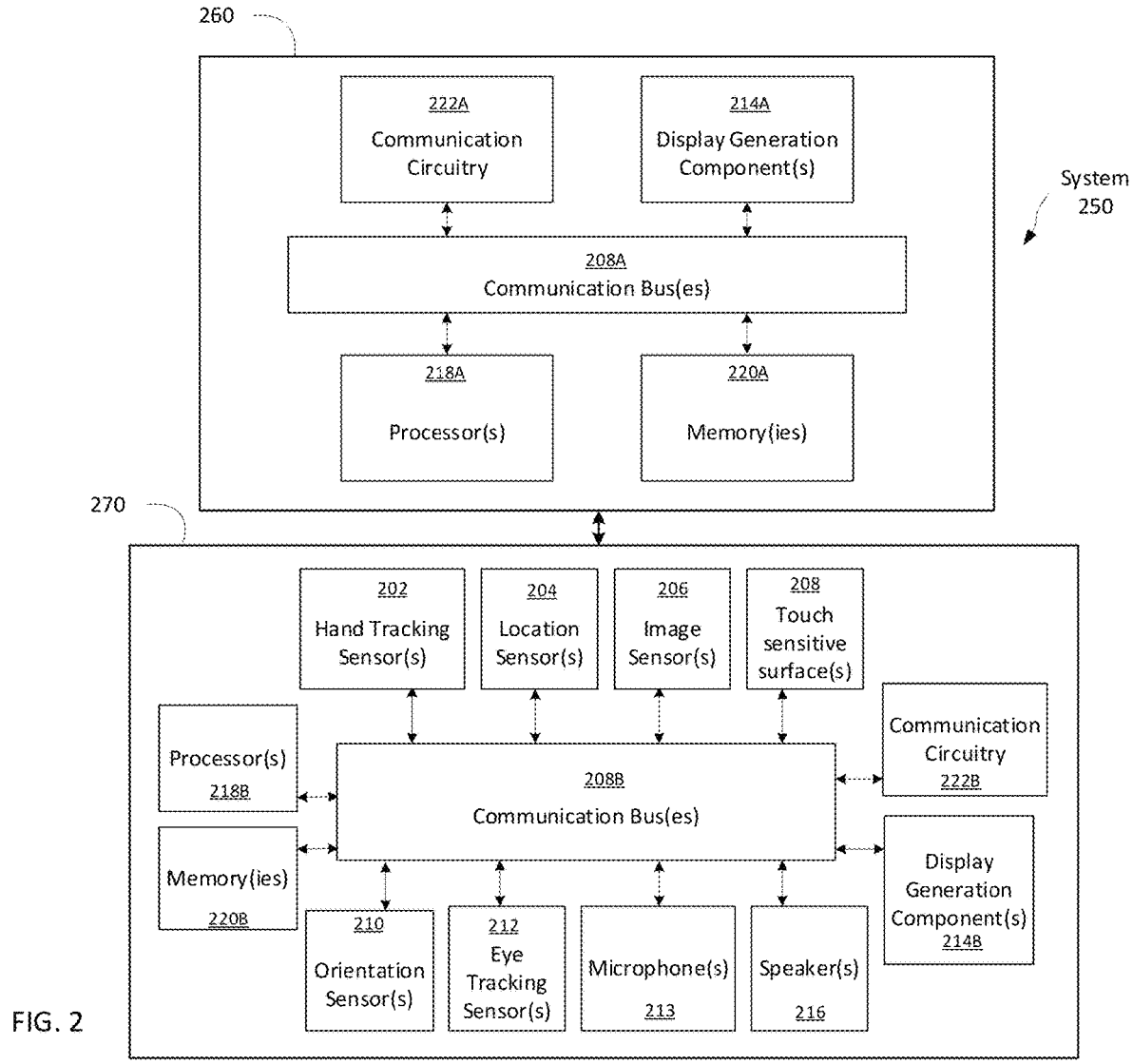
FIG. 2 illustrates a block diagram of an exemplary architecture for a system or device according to embodiments of the disclosure.

FIG. 2 illustrates a block diagram of an exemplary architecture for a system or device 250 according to embodiments of the disclosure. In some embodiments, device 250 is a mobile device, such as a mobile phone (e.g., smart phone), a tablet computer, a laptop computer, a desktop computer, a head-mounted display, an auxiliary device in communication with another device, etc. Device 250 optionally includes various sensors (e.g., one or more hand tracking sensor(s), one or more location sensor(s), one or more image sensor(s), one or more touch-sensitive surface(s), one or more motion and/or orientation sensor(s), one or more eye tracking sensor(s), one or more microphone(s) or other audio sensors, etc.), one or more display generation component(s), one or more speaker(s), one or more processor(s), one or more memories, and/or communication circuitry. One or more communication buses are optionally used for communication between the above-mentioned components of device 250.

In some embodiments, as illustrated in FIG. 2, system/device 250 can be divided between multiple devices. For example, a first device 260 optionally includes processor(s) 218A, memory or memories 220A, communication circuitry 222A, and display generation component(s) 214A optionally communicating over communication bus(es) 208A. A second device 270 (e.g., corresponding to device 200) optionally includes various sensors (e.g., one or more hand tracking sensor(s) 202, one or more location sensor(s) 204, one or more image sensor(s) 206, one or more touch-sensitive surface(s) 208, one or more motion and/or orientation sensor(s) 210, one or more eye tracking sensor(s) 212, one or more microphone(s) 213 or other audio sensors, etc.), one or more display generation component(s) 214B, one or more speaker(s) 216, one or more processor(s) 218B, one or more memories 220B, and/or communication circuitry 222B. One or more communication buses 208B are optionally used for communication between the above-mentioned components of device 270. First device 260 and second device 270 optionally communicate via a wired or wireless connection (e.g., via communication circuitry 222A-222B) between the two devices.

Communication circuitry 222A, 222B optionally includes circuitry for communicating with electronic devices, networks, such as the Internet, intranets, a wired network and/or a wireless network, cellular networks, and wireless local area networks (LANs). Communication circuitry 222A, 222B optionally includes circuitry for communicating using near-field communication (NFC) and/or short-range communication, such as Bluetooth®.

Processor(s) 218A, 218B include one or more general processors, one or more graphics processors, and/or one or more digital signal processors. In some embodiments, memory 220A, 220B is a non-transitory computer-readable storage medium (e.g., flash memory, random access memory, or other volatile or non-volatile memory or storage) that stores computer-readable instructions configured to be executed by processor(s) 218A, 218B to perform the techniques, processes, and/or methods described below. In some embodiments, memory 220A, 220B can include more than one non-transitory computer-readable storage medium. A non-transitory computer-readable storage medium can be any medium (e.g., excluding a signal) that can tangibly contain or store computer-executable instructions for use by or in connection with the instruction execution system, apparatus, or device. In some embodiments, the storage medium is a transitory computer-readable storage medium. In some embodiments, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like.

In some embodiments, display generation component(s) 214A, 214B include a single display (e.g., a liquid-crystal display (LCD), organic light-emitting diode (OLED), or other types of display). In some embodiments, display generation component(s) 214A, 214B includes multiple displays. In some embodiments, display generation component(s) 214A, 214B can include a display with touch capability (e.g., a touch screen), a projector, a holographic projector, a retinal projector, etc. In some embodiments, device 270 includes touch-sensitive surface(s) 208 for receiving user inputs, such as tap inputs and swipe inputs or other gestures. In some embodiments, display generation component(s) 214B and touch-sensitive surface(s) 208 form touch-sensitive display(s) (e.g., a touch screen integrated with device 270 or external to device 270 that is in communication with device 270).

Device 270 optionally includes image sensor(s) 206. Image sensors(s) 206 optionally include one or more visible light image sensors, such as charged coupled device (CCD) sensors, and/or complementary metal-oxide-semiconductor (CMOS) sensors operable to obtain images of physical objects from the real-world environment. Image sensor(s) 206 also optionally include one or more infrared (IR) sensors, such as a passive or an active IR sensor, for detecting infrared light from the real-world environment. For example, an active IR sensor includes an IR emitter for emitting infrared light into the real-world environment. Image sensor(s) 206 also optionally include one or more cameras configured to capture movement of physical objects in the real-world environment. Image sensor(s) 206 also optionally include one or more depth sensors configured to detect the distance of physical objects from device 270. In some embodiments, information from one or more depth sensors can allow the device to identify and differentiate objects in the real-world environment from other objects in the real-world environment. In some embodiments, one or more depth sensors can allow the device to determine the texture and/or topography of objects in the real-world environment.

In some embodiments, device 270 uses CCD sensors, event cameras, and depth sensors in combination to detect the physical environment around device 270. In some embodiments, image sensor(s) 206 include a first image sensor and a second image sensor. The first image sensor and the second image sensor work in tandem and are optionally configured to capture different information of physical objects in the real-world environment. In some embodiments, the first image sensor is a visible light image sensor and the second image sensor is a depth sensor. In some embodiments, device 270 uses image sensor(s) 206 to detect the position and orientation of device 270 and/or display generation component(s) 214 in the real-world environment. For example, device 270 uses image sensor(s) 206 to track the position and orientation of display generation component(s) 214B relative to one or more fixed objects in the real-world environment.

In some embodiments, device 270 includes microphone(s) 213 or other audio sensors. Device 270 uses microphone(s) 213 to detect sound from the user and/or the real-world environment of the user. In some embodiments, microphone(s) 213 includes an array of microphones (a plurality of microphones) that optionally operate in tandem, such as to identify ambient noise or to locate the source of sound in space of the real-world environment.

Device 270 includes location sensor(s) 204 for detecting a location of device 270 and/or display generation component(s) 214B. For example, location sensor(s) 204 can include a GPS receiver that receives data from one or more satellites and allows device 270 to determine the device's absolute position in the physical world.

Device 270 includes orientation sensor(s) 210 for detecting orientation and/or movement of device 270 and/or display generation component(s) 214B. For example, device 270 uses orientation sensor(s) 210 to track changes in the position and/or orientation of device 270 and/or display generation component(s) 214B, such as with respect to physical objects in the real-world environment. Orientation sensor(s) 210 optionally include one or more gyroscopes and/or one or more accelerometers.

Device 270 includes hand tracking sensor(s) 202 and/or eye tracking sensor(s) 212, in some embodiments. Hand tracking sensor(s) 202 are configured to track the position/location of one or more portions of the user's hands, and/or motions of one or more portions of the user's hands with respect to the extended reality environment, relative to the display generation component(s) 214B, and/or relative to another defined coordinate system. Eye tracking sensor(s) 212 are configured to track the position and movement of a user's gaze (eyes, face, or head, more generally) with respect to the real-world or extended reality environment and/or relative to the display generation component(s) 214B. In some embodiments, hand tracking sensor(s) 202 and/or eye tracking sensor(s) 212 are implemented together with the display generation component(s) 214B. In some embodiments, the hand tracking sensor(s) 202 and/or eye tracking sensor(s) 212 are implemented separate from the display generation component(s) 214B.

In some embodiments, the hand tracking sensor(s) 202 can use image sensor(s) 206 (e.g., one or more IR cameras, 3D cameras, depth cameras, etc.) that capture three-dimensional information from the real-world including one or more hands (e.g., of a human user). In some embodiments, the hands can be resolved with sufficient resolution to distinguish fingers and their respective positions. In some embodiments, one or more image sensor(s) 206 are positioned relative to the user to define a field of view of the image sensor(s) 206 and an interaction space in which finger/hand position, orientation and/or movement captured by the image sensors are used as inputs (e.g., to distinguish from a user's resting hand or other hands of other persons in the real-world environment). Tracking the fingers/hands for input (e.g., gestures, touch, tap, etc.) can be advantageous in that it does not require the user to touch, hold or wear any sort of beacon, sensor, or other marker.

In some embodiments, eye tracking sensor(s) 212 includes at least one eye tracking camera (e.g., infrared (IR) cameras) and/or illumination sources (e.g., IR light sources, such as LEDs) that emit light towards a user's eyes. The eye tracking cameras may be pointed towards a user's eyes to receive reflected IR light from the light sources directly or indirectly from the eyes. In some embodiments, both eyes are tracked separately by respective eye tracking cameras and illumination sources, and a focus/gaze can be determined from tracking both eyes. In some embodiments, one eye (e.g., a dominant eye) is tracked by a respective eye tracking camera/illumination source(s).

Device 270 and system 250 are not limited to the components and configuration of FIG. 2, but can include fewer, other, or additional components in multiple configurations. In some embodiments, system 250 can be implemented in a single device. A person using system 250, is optionally referred to herein as a user of the device. Attention is now directed towards an example system architecture for generating and presenting three-dimensional previews of content and associated processes that are implemented on electronic devices, such as electronic devices 260 and 270. The system architecture can describe the flow and transfer of data from a content creation application running on the first electronic device to a three-dimensional graphic rendering application running on the second electronic device. In some embodiments, the processes of the system described below can be operated by processors 218A, 218B of the devices 260 and 270.

Figure 3:
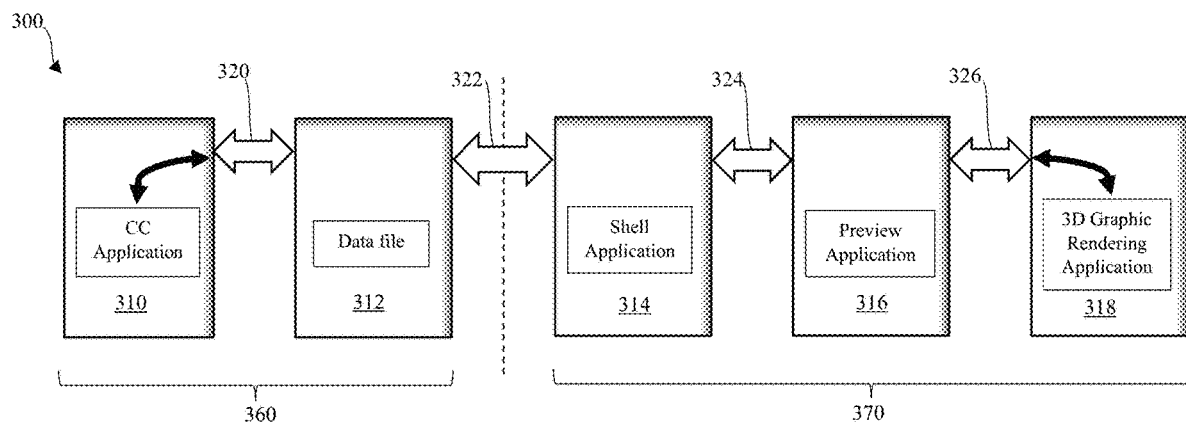
FIG. 3 illustrates a block diagram of an exemplary system architecture for generating and presenting a content item in three-dimensions according to embodiments of the disclosure.

FIG. 3 illustrates a block diagram of an exemplary system architecture 300 for generating and presenting a content item in three-dimensions according to embodiments of the disclosure. As discussed above, a content item (e.g., an XR content item, such as virtual object 130 in FIG. 1) created in a content creation application running on a first electronic device may be previewed in three-dimensions via a three-dimensional graphic rendering application running on a second electronic device, which is optionally in communication with the first electronic device. As discussed above, the first electronic device may be a mobile or non-mobile computing device, such as a mobile phone (e.g., smart phone), a tablet computer, a laptop computer, or a desktop computer, and the second electronic device may be a head-mounted display, a projector, a hologram generator, an auxiliary device in communication with another device, etc. As described below, the content creation application may, in response to a request by the user to preview the content item in three-dimensions, transmit graphical data corresponding to the content item via a communication link to the three-dimensional graphic rendering application, which may generate and present the three-dimensional preview of the content item.

While certain aspects of content items created in the content creation application can be captured in two-dimensions (e.g., color, two-dimensional dimensions such as height and width, planar views, etc.), other aspects cannot be captured. Particularly, if the content items being created in the content creation application are intended to be and/or are explicitly designed to be displayed in three-dimensional environments, a two-dimensional preview may provide the designer (i.e., the user) with incomplete information about the appearance of the content in three-dimensions. Alternative views (e.g., side and rear views), surface texture, lighting effects, etc. may not be visible or capturable within a two-dimensional preview. Further, in order to view alternative views of the content, for example, the user may need to generate a new preview for each alternative view, increasing the time and effort and thus the complexity of work-flow for designing, previewing, and modifying content items. Accordingly, providing a preview in three-dimensions may be particularly useful during the design stages of the digital content creation process, as discussed below.

In some embodiments, as shown in FIG. 3, a user, using the first electronic device 360 (e.g., corresponding to 260 in FIG. 2), may be working in a content creation application 310 ("CC application"). The content creation application optionally communicates with an integrated design environment 312 (IDE). The content creation application 310 and/or the IDE 312 utilizes a data file (e.g., including script, executable code, etc.) describing a content item (e.g., defining the appearance, actions, reactivity, etc. of a content item (e.g., one or more virtual objects)) designed for use with a three-dimensional operating system (e.g., designed for a three-dimensional graphical environment). In some embodiments, the data file describing the content item may be uploaded to and/or launched in the content creation application 310 using a communication link 320 between the IDE 312. In some embodiments, a two-dimensional representation of the content item may be displayed (e.g., via display generating component 214A in FIG. 2) on the first electronic device. It is understood that the two-dimensional representation is a function of the two-dimensional display of the first electronic device, but that the two-dimensional representation may represent three-dimensional content. In some embodiments, the two-dimensional representation of the content item may be displayed within a display UI of the content creation application. In some embodiments, the two-dimensional representation of the content item may be displayed within a display UI separate from the content creation application (e.g., a display UI running on a second application in communication with the content creation application). It is understood that the content creation application is running on the first electronic device, and the data file being uploaded to the content creation application may be stored on the first electronic device (e.g., stored in memory 220A or downloaded and accessed from web-based storage). In some embodiments, the data file may be edited while running on the content creation application. In such some embodiments, the script, executable code, etc. may be displayed in a portion of the display UI of the content creation application, such that a user may directly edit portions of the script, executable code, etc. at the first electronic device. The edits made to the data file may, if applicable, update the two-dimensional representation of the content item displayed at the first electronic device. As described herein, in some embodiments, edits to the data file may be achieved in IDE 312 in communication with content creation application 310.

In some embodiments, the user may request to preview the two-dimensional representation of the content item in three-dimensions (e.g., using the first electronic device). As an example, the content creation application may include a selectable user interface element (e.g., displayed on the display UI or at some other UI in or in communication with the content creation application) that, when selected, generates the request. In some embodiments, the request may be inputted using one or more input devices in communication with the first electronic device, such as by pressing one or more keys on a keyboard or buttons on a mouse, for example. In response to the request, as shown in FIG. 3, the first electronic device may initiate a data transfer with the second electronic device 370 (e.g., corresponding to device 270 in FIG. 2). As shown in FIG. 3, the second electronic device 370 may be configured with one or more applications for generating a three-dimensional preview of the content item. The content item can be presented to the user using the second electronic device as a three-dimensional representation of the content item, and a two-dimensional representation of the content item can be displayed at the first electronic device. The first electronic device may communicate with the second electronic device using a communication link 322. Communication link 322 can be any suitable wired or wireless communication means, including but not limited to, universal serial bus (USB), Wi-Fi or Bluetooth® (e.g., wireless transfer), or, if the disclosed architecture 300 is implemented on a single electronic device, via cross-process communication (e.g., inter-processor communications).

In some embodiments, the three-dimensional data of the data file (e.g., all or portions of the script, executable code, etc. within the data file) may be transferred to a first intermediary application 314 running on the second electronic device. As an example, the first intermediary application may be a preview shell application configured to receive all or portions of the script, executable code, etc. of the data file transferred from the content creation application of the first electronic device, and in response to receiving the data file (or portions thereof), launch a preview shell. In some embodiments, that the preview shell application is optionally a trusted application (e.g., a first-party application) for the second electronic device, such that the data, script, executable code, etc. loaded inside the preview shell application is protected. The preview shell application 314 may launch a second intermediary application 316, which may be a preview agent application that is in communication with the preview shell application 314 via communication link 324. In some embodiments, the preview agent application 316 running on the second electronic device 370 may be configured to execute code provided from the first electronic device (e.g., a three-dimensional graphic data representation of the script, executable code, etc. of the data file) communicated to the second electronic device via preview shell application 314. The preview agent application can transfer the executable code to a three-dimensional graphic rendering application 318 using a communication link 326. In some embodiments, the preview shell application 314 and preview agent application 316 may be included to allow for secure communications between the first electronic device and second electronic device of an untrusted application or an unentitled application (e.g., a third-party application) that may be executable by the preview agent application 318 without risking security or crashing hardware or software of the second electronic device. In some embodiments, the three-dimensional graphic rendering application 318 (3D graphic rendering application) may receive a request to generate content from the preview agent application 314, and generate a virtual object in three-dimensions. The three-dimensional virtual object can be presented to the user in a three-dimensional or two-dimensional representation. The three-dimensional preview of the content item may be displayed on the second electronic device (e.g., via display generation component 214B in FIG. 2) as a three-dimensional content item rendered in a three-dimensional XR environment. The three-dimensional graphic rendering of the content item can be presented as a two-dimensional representation of the content item displayed on the first electronic device (e.g., having a two-dimensional display). Thus, as outlined above, one or more communication channels or links may be established between the first electronic device and the second electronic device and between applications running on the first and second electronic devices, and more particularly, between the content creation application 310 of the first electronic device and the three-dimensional graphic rendering application 318 of the second electronic device.

As an example, the three-dimensional content preview of the code within the data file may provide the user with useful visual feedback regarding the appearance of the content in an XR environment. In some embodiments, edits or modifications to the data file running in the content creation application may create corresponding changes to the appearance of the three-dimensional preview, which can be rendered and presented to the user at the second electronic device and/or at the first electronic device. As an example, the user may wish to edit or modify one or more features of the content item and view a new three-dimensional preview of the content item in accordance with the edits or modifications. For example, the user may, via one or more input devices in communication with the first electronic device (e.g., a keyboard), rewrite portions of the script, executable code, etc. of the data file, optionally while the two dimensional representation of the content item is displayed on the first electronic device and the three-dimensional preview of the content item is concurrently presented to the user using the second electronic device. The user may finalize the edits or modifications (e.g., by saving the changes to the data file) and may request a new preview of the content item representing the data file. Additionally or alternatively, the new preview may be automatically requested once the edits or modifications are finalized by the user. The new (e.g., newly updated) data may be transferred from the content creation application to the three-dimensional rendering application in the manner described above, and the three-dimensional preview of the content item currently presented using the second electronic device may be updated, such that the three-dimensional preview of the content item has an updated appearance. In some embodiments, the corresponding updates can be made to the two-dimensional representation of the content item displayed on the first electronic device.

As mentioned above, the preview shell application may be a trusted application that executes only trusted code and the preview agent application may be an application configured to execute untrusted application code (e.g., generated by a third party application developer). The system architecture 300 shown in FIG. 3 allows script, executable code, etc. corresponding to the creation of content (as well as the animation of the content) in the data file to be executed within the preview agent application) on the second electronic device despite potentially including untrusted code. Thus, one advantage of the disclosed three-dimensional previewing system is that untrusted user data and code written at a first electronic device may be securely communicated to and executed on a second electronic device to generate and present a three-dimensional preview of the data on the second device (and in a two-dimensional representation on the first device) while maintaining security of communication between the first electronic device and the second electronic device, and without compromising the hardware and/or software of the second electronic device. For example, in an instance where the user code within the data file crashes during execution, the first and/or second electronic devices can be protected from potential impacts of the untrusted code (e.g., avoiding crashing the device(s)).

As mentioned above, the three-dimensional preview of the content item may be displayed on the second electronic device while the two-dimensional representation of the content item is also concurrently (e.g., partially or fully coextensive in time) displayed on the first electronic device. In some embodiments, the system architecture 300 shown in FIG. 3 may be provided in a single electronic device (e.g., a laptop computer, desktop computer, mobile device, etc.), rather than implemented and distributed between two electronic devices. For example, the three-dimensional graphic rendering application may be provided within or at least partially as, a simulator configured to generate content for a computer-generated environment in three-dimensions, without presenting the content in a three-dimensional representation due to the two-dimensional display characteristics of the electronic device (e.g., a two-dimensional display). In such some embodiments, in response to receiving a request to display a content item in three-dimensions, the three-dimensional graphic rendering application may generate and present a preview of the content in three-dimensions within the computer-generated environment of the simulator as a two-dimensional representation (e.g., in a different window on the display of the electronic device). Additionally or alternatively, in some embodiments, the content creation application may be communicatively linked directly or indirectly to the three-dimensional graphic rendering application running on the same electronic device as the content creation application. In such some embodiments, all or portions of the script, executable code, etc. of the data file may be transferred to the three-dimensional graphic rendering application 318 on-device. The three-dimensional graphic rendering application may, in such embodiments, optionally be configured with at least portions of the functionalities of the preview shell application and the preview agent application, for example. In some embodiments, one or more of the intermediate applications between the content creation application and the three-dimensional graphic rendering application may be omitted. In some such embodiments, the functionality of one or more of the intermediate applications can be implemented as part of the content creation application or the three-dimensional graphic rendering application. Additionally, it should be understood that, in some embodiments, a request may propagate to the three-dimensional graphic rendering application from the content creation application as shown in FIG. 3, but that the rendered three-dimensional content from the three-dimensional graphic rendering application may communicate more directly back to the content creation application to reduce latency between generating the three-dimensional content and displaying it on the first electronic device.

It should be understood that, while referred to herein as applications, the intermediary system components (e.g., the preview shell and the preview agent) may be provided or implemented as one or more pieces of software that are executed individually or in combination within the second electronic device's processor (e.g., processor 218B) rather than being provided as discrete applications. As mentioned above, in some embodiments, the graphical data communicated along the communication channel between the first electronic device and the second electronic device may be synchronized. In such some embodiments, the communication channel between the content creation application and the three-dimensional rendering application may be bidirectional, allowing data to be transferred therebetween in either direction. In this way, as discussed in detail with reference to FIGS. 5A-5B, a user may interact with the three-dimensional preview of the content item, such that the user interactions not only influence the appearance of the three-dimensional preview of the content item, but that they also influence the appearance of the two-dimensional representation of the content item at the content creation application.

Figure 4:
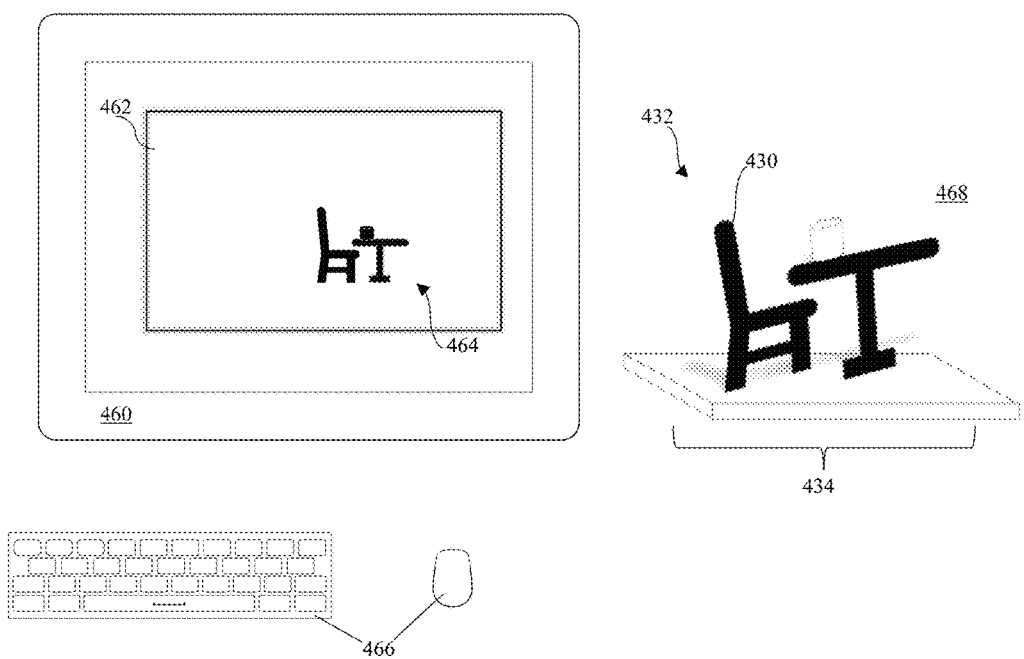
FIG. 4 illustrates a first electronic device displaying a two-dimensional representation of a content item and a second electronic device displaying a three-dimensional representation of the content item according to embodiments of the disclosure.

Attention is now directed towards exemplary concurrent displays of a two-dimensional representation of content items and corresponding three-dimensional previews of the content items. As discussed above, the two-dimensional representation of the content items can be displayed on a first electronic device (e.g., via a content creation application) and the three-dimensional previews of the content items can be concurrently displayed on a second electronic device (e.g., via a three-dimensional graphic rendering application). FIG. 4 illustrates a first electronic device 460 displaying a two-dimensional representation of a content item 464 and a second electronic device displaying a three-dimensional representation of the content item (e.g., the one or more virtual objects 430) according to embodiments of the disclosure.

As shown in FIG. 4, the first electronic device 460 in environment 468 may include a content creation application 462 illustrating an authoring environment GUI. As shown, the authoring environment GUI can be displayed on the first electronic device 460, which may be a desktop computing device, for example, and which may be in communication with one or more input devices 466. As shown in FIG. 4, the second electronic device (i.e., a viewpoint associated with the second electronic device (e.g., corresponding to electronic device 270 in FIG. 2), which may be a head mounted display, for example) may present a three-dimensional environment 468 or a representation of environment 468 (e.g., 3D computer-generated environment defined by X, Y and Z axes) including a three-dimensional preview application 434. As described herein, three-dimensional preview application 434 can including content 432 and corresponding content can be display in two-dimensions in the content creation application as represented by the two-dimensional content 464.

In the example of FIG. 4, the three-dimensional content 432 may include one or more virtual objects 430, such as a chair, tables, cups, etc., but it should be understood that these objects are merely representative, and that one or more different virtual objects (e.g., 2D or 3D objects) can be imported or designed within the content creation application (including a number of shapes, objects, symbols, text, number and the like) and included in the 3D preview application 434.

Additionally, it should be understood that the 3D environment (or 3D virtual object) described herein and presented using the second electronic device (e.g., a head mounted display) may be a three-dimensional representation of a two-dimensional (2D) environment (or 2D virtual object) concurrently displayed on the first electronic device (e.g., displayed on a 2D screen of the first electronic device). In some embodiments, the 3D preview application 434 can display gridlines or other indicators to provide a content creator with information regarding placement and/or size of a virtual object in the 3D environment.

As discussed above, the user may desire to preview a content item being designed and/or edited in the content creation application or in an IDE on the first electronic device as the content is intended to appear in three-dimensions. In the example of FIG. 4, the user may be designing an XR scene including one or more virtual objects (e.g., chairs, tables, cups, etc.). The scene can include one or more virtual objects being specifically designed for display within a three-dimensional XR environment (e.g., a computer game, application, movie, TV show, etc.). As such, it may be particularly advantageous for the content creator to be able to preview a current state (e.g., current appearance, form, perspective, etc.) and/or behavior of the one or more virtual objects within the scene in three-dimensions (e.g., responses to inputs). As described above when referring to FIG. 3, the user may request to preview the content in three-dimensions within the content creation application 462 (or an IDE) on the first electronic device 460 (e.g., by selecting a "preview" user interface element displayed within the content creation application). As shown in FIG. 4, a three-dimensional preview of the content 432 may be presented using the second electronic device. Additionally, a two-dimensional representation of the generated content (e.g., two-dimensional content 464) can be displayed on the first electronic device 460. In some embodiments, a representation of the first electronic device 406 and its two dimensional preview of the content may be concurrently presented using the second electronic device, such that the user of the second electronic device is presented concurrently with the two-dimensional content 464 and the three-dimensional content 432 in environment 468. It is understood that the generation and presentation of the preview of the three-dimensional content 432 may be performed by the exemplary system 300 described above and shown in FIG. 3. Thus, one advantage of the disclosed three-dimensional preview generation system and method is that a three-dimensional preview of a content item being created may be presented to provide a user with immediate and accurate feedback regarding the appearance and/or behavior of the content item in actual implementation (e.g., which may only be possible using the hardware and software of the second electronic device or a simulator of the second electronic device).

In some embodiments, the user may desire to interact with the three-dimensional preview of the content displayed on the second electronic device, for example, to gain additional perspective and feedback regarding the content being designed via the content creation application and/or behavior of the content. As an example, at the second electronic device, the user may scale, zoom into/out of, rotate, and/or move the three-dimensional content 432 (e.g., by selecting user interface elements displayed within the 3D environment 468 and/or by performing a gesture (e.g., finger tap and pinch)). Additionally or alternatively, in some embodiments, the user may scale, zoom into/out of, rotate, and/or move the three-dimensional preview using the one or more input devices 466 in communication with the first electronic device 460 (e.g., by selecting, via a mouse click, user interface elements displayed within the content creation application 462 or inputting a sequence of commands via a keyboard). Manipulating the three-dimensional content 432 in the preview may allow the user to obtain, in three-dimensions, more comprehensive (and more useful) visual feedback, such as alternative views of the content items from any direction/perspective (e.g., side and/or rear views), surface texture and/or coloration of the content items, spatial relations between the one or more virtual objects 430 of the content, depth perspective of the one or more virtual objects 430, among other possibilities. Such visual feedback may be difficult or impossible to obtain via a 2D representation. Using this visual feedback, the user may then make edits to the content in real time.

As an example, the user may, via the one or more input devices 466, edit the script, executable code, etc. running in the content creation application 462 to change the appearance of the one or more virtual objects 430 of the content 432 that is previewed using the second electronic device. For example, the user may desire to change the color, size, surface texture, etc. of the one or more virtual objects 430 of the content 432, add, delete, or reposition one or more virtual objects of the content item, and/or add, delete, or modify different behaviors associated with inputs. After the edits or modifications have been made to the representation of the content item in two-dimensions, the three-dimensional preview of the content 432 may be updated using the second electronic device, such that the user may visually analyze the new appearance of the content in three-dimensions, as discussed previously when referring to FIG. 3. Thus, one advantage of the disclosed three-dimensional preview generation system and method is that a three-dimensional preview of a content item being created may be updated in real time (e.g., within 50 ms or less) to provide a user with immediate and accurate feedback regarding changes to the appearance and form of the content item being created.

In some embodiments, the presentation of the three-dimensional preview of the content may be altered and/or updated in response to changes in the viewpoint of the second electronic device (e.g., changes in the viewpoint associated with a head mounted display). In such some embodiments, the user wearing, holding, or otherwise looking through a display of, the second electronic device may reorient a viewpoint associated with the second electronic device with respect to the 3D environment 468 being displayed. For example, the user may "walk around" the content 432 displayed within the 3D environment 468 to obtain alternative side views of the one or more virtual objects 430 (or a view of the content from higher or lower angles (e.g., a top view)). The preview of the three-dimensional content 432 in preview application 434 may remain fixed within the 3D environment 468 (e.g., fixed in position and orientation with respect to the real-world environment) as the viewpoint of the second electronic device is moved by the user.

Additionally or alternatively, it may be particularly advantageous for the user to be able to edit the content currently being previewed in three-dimensions by interacting with the three-dimensional preview of the content. Attention is now directed towards exemplary three-dimensional previews of content items displayed via an electronic device (e.g., a head mounted display). As discussed below, user input received at the electronic device (e.g., corresponding to the second electronic device discussed above) may alter the appearance of the three-dimensional preview displayed on the electronic device, which may concurrently alter the appearance of the two-dimensional representation of the content items displayed in a content creation application (e.g., on a desktop computer).

Figure 5A:
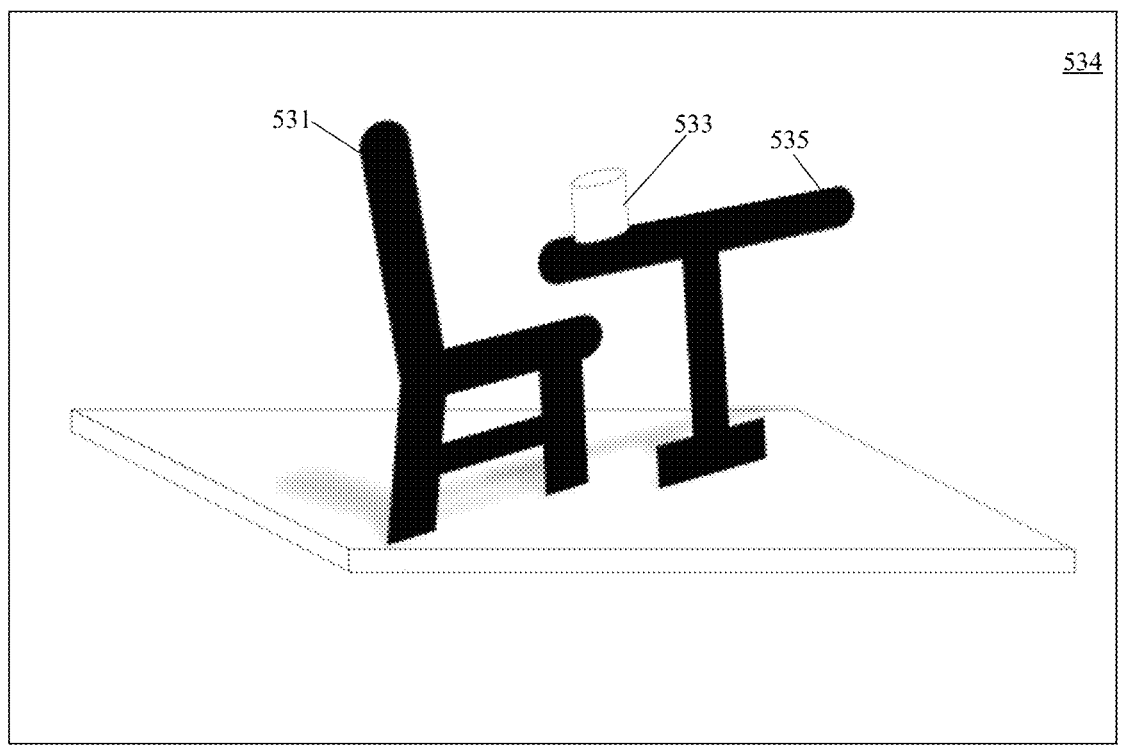
FIG. 5A illustrates a preview of content items in three dimensions displayed using an electronic device according to embodiments of the disclosure.

FIG. 5A illustrates a preview of content items in three-dimensions displayed using an electronic device according to embodiments of the disclosure. As discussed above when referring to FIG. 4, content created in a content creation application on a first electronic device may be previewed in three-dimensions on a second electronic device to provide visual feedback regarding the appearance and form of the content in three-dimensions. Continuing the example of FIG. 4, FIG. 5A illustrates one or more virtual objects, such as a chair 531, a cup 533, and a table 535, displayed within a 3D preview application 534 on an electronic device (e.g., corresponding to the second electronic device above). As discussed below, the user may, at the electronic device, interact with the content item (e.g., the one or more virtual objects) 531, 533, and 535 to change the appearance or behavior of such objects. In some embodiments, the changes in appearance and/or behavior of the objects can result in a modification of the two-dimensional representation of the content (e.g., corresponding to 464 in FIG. 4), and thus edit or modify the data file defining/describing the content.

Referring back to FIG. 3, three-dimensional content data may be exchanged between the content creation application on the first electronic device and the 3D graphic rendering application on the second electronic device, wherein the 3D content data can be exchanged bidirectionally. As discussed above, changes to the script, executable code, etc. of the data file defining content running in the content creation application may result in corresponding changes to the two-dimensional representation of the content on the first electronic device, and thus corresponding changes to the three-dimensional preview of the content on the second electronic device. Additionally, in some embodiments, changes to the three-dimensional preview of the content running in the 3D graphic rendering application on the second electronic device may result in corresponding changes to the two-dimensional representation of the content on the first electronic device, and thus corresponding changes to the script, executable code, etc. of the data file defining the content. For example, referring to FIG. 5A, the user may wish to change the position of the chair 531 with respect to the positions of the cup 533 and the table 535 of the 3D preview application 534.

Figure 5B:
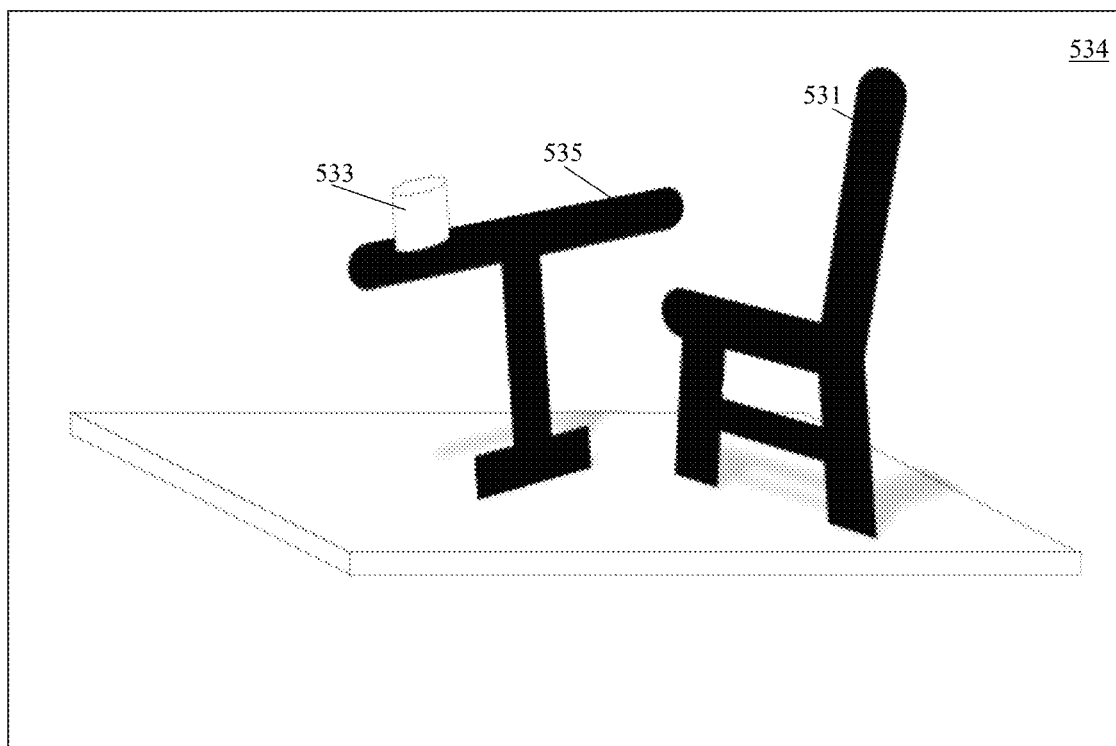
FIG. 5B illustrates an example modification to the appearance of the content items in three dimensions according to embodiments of the disclosure.

FIG. 5B illustrates an example modification to the appearance of the content items in three-dimensions according to embodiments of the disclosure. As mentioned above, input may be received at the electronic device, wherein the input is a user interaction with the three-dimensional preview of the content items. As an example, the user may virtually select (e.g., via a finger tap/touch) the chair 531, and drag the chair 531, while the 3D preview application 534 continues to be displayed, to a new location opposite the chair's initial location within the 3D environment, as shown in the example of FIG. 5B. As shown, the three-dimensional preview of the content items 531, 533 and 535 has changed with respect to the initial positioning of the content items 531, 533 and 535 shown in the example of FIG. 5A. This change in the three-dimensional preview of the content items at the electronic device may, as mentioned above, change/modify the data file defining the content items. For example, referring back to FIG. 3, the repositioning of the chair 531 may change the 3D data running in the 3D graphic rendering application 318. This change to the 3D data may then propagate to the preview agent application, the preview shell application, etc. back to the content creation application. The content creation application 310 may update the two-dimensional representation of the content items in accordance with the repositioning of the chair 531, which may then be translated to a corresponding change in the script, executable code, etc. of the data file in IDE 312 (e.g., a corresponding change to a coordinate definition listed in the script, executable code, etc. of the data file). In this way, as outlined above, user input received at the (second) electronic device (e.g., a head mounted display) corresponding to an interaction with the three-dimensional preview of the content items may be captured by changes to the data file defining the content items in the content creation application at the first electronic device. Thus, an advantage of the synchronization of 3D data between the first electronic device and the second electronic device is that synchronization allows the user to work and interact with user code as 3D data on either or both the first electronic device or the second electronic device. Additionally, the disclosed process of modifying the appearance of the content items by manipulating the content items in three-dimensional space may improve user experience by providing a simple and intuitive operation of editing the script, executable code, etc. of the graphical data file. Thus, another advantage is that user interaction with the one or more virtual objects of the three-dimensional preview can provide for easier and more accurate object manipulation and/or modification.

In some embodiments, the concurrent display of the content items in two-dimensions and in three-dimensions may provide for a multi-user experience. For example, a first user may operate a first electronic device (e.g., a desktop computer) including a content creation application and a second user may operate a second electronic device (e.g., a head mounted display) including at least a 3D graphic rendering application, in accordance with some embodiments described herein. As discussed above, the content creation application may include content items comprising one or more virtual objects (e.g., 531, 533, and 535) displayed as a two-dimensional representation on the first electronic device. The 3D graphic rendering application may be configured to display a preview of the content items in three-dimensions (e.g., in 3D preview application 534) on the second electronic device. Thus, the first user may view the two-dimensional representation of the content items on the first electronic device, and the second user may concurrently view the three-dimensional preview of the content items on the second electronic device. The first and the second users may then collaboratively view, modify, and update the content items by individually operating the first and the second electronic devices, respectively. As outlined above, edits or modifications made to the content items on a respective electronic device cause the corresponding representation of the content items on the other electronic device to be updated in accordance with the edits or modifications. The first and the second users may thus actively interact with the two-dimensional and three-dimensional representations of the content items, respectively, to collaboratively modify and eventually finalize the appearance and form of the content items. Thus, another advantage is that concurrent display of the content items in two-dimensions on a first electronic device and content items in three-dimensions on a second electronic device can provide for efficient and more succinct user collaboration between a first user operating the first electronic device and a second user operating the second electronic device.

It should be understood that the virtual objects (e.g., 531, 533, and 535) shown in FIGS. 5A-5B are exemplary and that alternative and/or additional virtual objects may be provided within the 3D preview application 534. It should also be understood that, though not explicitly shown in FIGS. 5A-5B, two-dimensional representations of the virtual objects may concurrently be displayed (e.g., on a first electronic device) within the user's view, as discussed throughout this disclosure. It should also be understood, as mentioned herein, that the two-dimensional representation of the content items and the corresponding three-dimensional preview of the content items can be concurrently displayed on a single electronic device (e.g., using a simulator application running the 3D graphic rendering application). It is also understood that, when changes to the three-dimensional preview of content are received at the second electronic device, as discussed above, real-world objects (e.g., a real-world desk, lighting/shading effects from a lamp, etc.) within the viewpoint of the second electronic device may not be captured by the two-dimensional representation of the content (e.g., a two-dimensional representation of a real-world desk is not rendered and displayed on the first electronic device). Thus, in addition to the second electronic device providing a three-dimensional representation, which can be responsive to environmental inputs, a comparison of the two-dimensional representation on the first electronic device and the three-dimensional representation on the second electronic device can be used to differentiate behaviors resulting from the three-dimensional content (e.g., lighting effects, etc.) that may not be reflective of changes to the content itself.

Figure 6A:
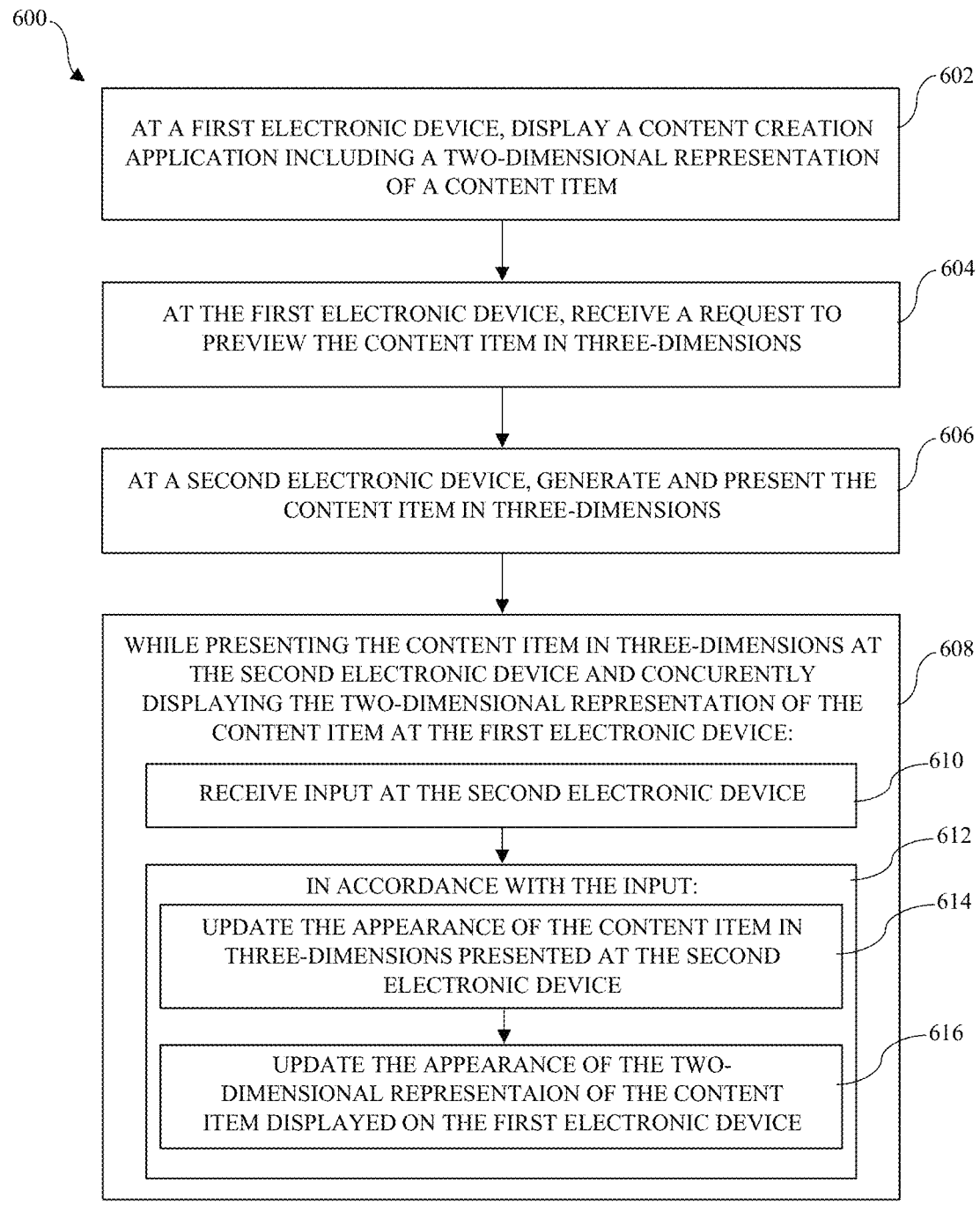
FIGS. 6A-6B illustrate a flow diagram illustrating a process for generating and presenting a content item in three dimensions according to embodiments of the disclosure.
Figure 6B:
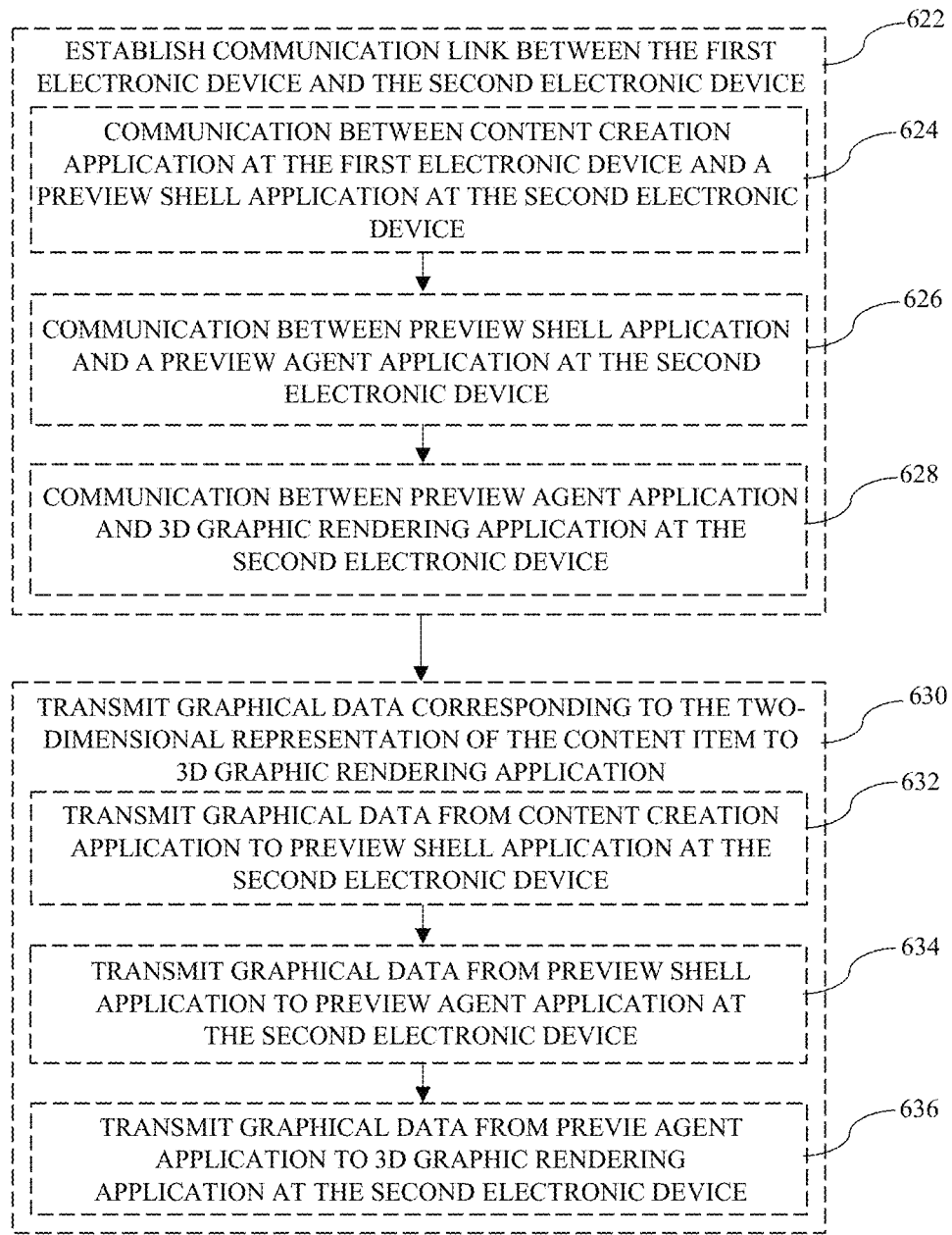

FIGS. 6A-6B illustrate a flow diagram illustrating a process 600 for generating and presenting a content item in three-dimensions according to embodiments of the disclosure. As shown in FIG. 6A, at 602, a first electronic device (e.g., a desktop computer, laptop computer, tablet computer, mobile device, etc.) displays a content creation application, which can include a two-dimensional representation of a content item (e.g., one or more objects). In some embodiments, a request to preview the content item in three-dimensions can be received at 604 at the first electronic device (e.g., via one or more input devices in communication with the first electronic device. The request optionally corresponds to selection of a "preview" user interface element displayed within the content creation application). In some embodiments, the request can be received from execution of code in an IDE. At 606, a preview of the content item in three-dimensions can be generated and presented using a second electronic device (e.g., a head-mounted display or other projection system/device in communication with the first electronic device).

In some embodiments, as discussed above, the disclosed process 600 may utilize a content previewing system (e.g., corresponding to system 300 shown in FIG. 3) for generating and presenting a content item in three-dimensions. For example, as shown in FIG. 6B, generating and presenting the content item in three-dimensions may include establishing a communication link between the first electronic device and the second electronic device at 622, and transmitting graphical data (e.g., 3D graphical data) corresponding to the two-dimensional representation of the content item to a three-dimensional graphic rendering application at the second electronic device at 630. In some embodiments, as shown in FIG. 6B, establishing the communication link between the first electronic device and the second electronic device optionally includes: establishing communication between the content creation application at the first electronic device and a preview shell application at the second electronic device at 624; establishing communication between the preview shell application and a preview agent application at the second electronic device at 626; and establishing communication between the preview agent application and the 3D graphic rendering application at the second electronic device at 628. As shown, transmitting graphical data corresponding to the two-dimensional representation of the content item to the 3D graphic rendering application optionally includes: transmitting graphical data from the content creation application to the preview shell application at the second electronic device (e.g., via wired or wireless connections) at 632; transmitting the graphical data from the preview shell application to the preview agent application at the second electronic device (e.g., via cross process communication) at 634; and transmitting the graphical data from the preview agent application to the 3D graphic rendering application at the second electronic device (e.g., via cross process communication) at 636.

Referring to FIG. 6A, at 608, while the content item in three-dimensions is presented using the second electronic device and the two-dimensional representation of the content item is concurrently displayed using the first electronic device, input is optionally received at the second electronic device at 610. In some embodiments, the input is optionally an interaction with the content item in three-dimensions presented at the second electronic device (e.g., a finger tap or finger touch, a reorientation of a viewpoint associated with the second electronic device, or a drag and drop interaction with one or more objects of the content item). In accordance with the input, at 612, the appearance of the content item in three-dimensions presented using the second electronic device is optionally updated (e.g., the appearance of the three-dimensional preview changes based on the input) at 614, and the appearance of the two-dimensional representation of the content item displayed on the first electronic device is updated (e.g., the appearance of the two-dimensional representation of the content item changes based on the input) at 616.

It is understood that process 600 is an example and that more, fewer, or different operations can be performed in the same or in a different order. Additionally, the operations in process 600 described above are, optionally, implemented by running one or more functional modules in an information processing apparatus such as general-purpose processors (e.g., as described with respect to FIG. 2) or application specific chips, and/or by other components of FIG. 2.

Therefore, according to the above, some embodiments of the disclosure are directed to a method of three-dimensional preview generation. The method can comprise: displaying, at a first electronic device, a content creation application including a two-dimensional representation of a first content item; receiving, at the first electronic device, a request to preview the first content item in three-dimensions; generating and presenting, using a second electronic device, the first content item in three-dimensions; and while presenting the first content item in three-dimensions using the second electronic device and concurrently displaying the two-dimensional representation of the first content item using the first electronic device: receiving input at the second electronic device; and in accordance with the input, updating an appearance of the first content item in three-dimensions presented using the second electronic device and updating an appearance of the two-dimensional representation of the first content item displayed on the first electronic device.

Additionally or alternatively, in some embodiments, the first electronic device may be a laptop computer, a desktop computer, or a tablet. Additionally or alternatively, in some embodiments, the second electronic device may be a head-mounted display.

Additionally or alternatively, in some embodiments, the method may further comprise capturing, using the second electronic device, at least a portion of a real-world environment using one or more input devices of the second electronic device. Additionally or alternatively, in some embodiments, generating and presenting the first content item in three dimensions can include presenting a representation of the captured portion of the real-world environment.

Additionally or alternatively, in some embodiments, capturing the portion of the real-world environment may include capturing the first electronic device and the content creation application, and generating and presenting the first content item in three dimensions may include presenting a representation of the first electronic device and the content creation application including the two-dimensional representation of the first content item.

Additionally or alternatively, in some embodiments, the method may further comprise capturing, using the second electronic device, at least a portion of a real-world environment including a light source using one or more input devices of the second electronic device. Additionally or alternatively, in some embodiments, generating and presenting the first content item in three dimensions can include presenting a lighting effect due to interaction between the first content item and the light source, and updating the appearance of the first content item in three-dimensions presented using the second electronic device can include a change in the appearance of the lighting effect. Additionally or alternatively, in some embodiments, the appearance of the two-dimensional representation of the first content item displayed on the first electronic device may not include the lighting effect.

Additionally or alternatively, in some embodiments, the input received at the second electronic device may be an interaction with the first content item in three dimensions that includes a selection of the first content item in three dimensions using one or more fingers or using one or more input devices of the second electronic device. Additionally or alternatively, in some embodiments, the input received at the second electronic device may be a reorientation of the second electronic device with respect to the first content item in three dimensions.

Additionally or alternatively, in some embodiments, the content creation application may include a two-dimensional representation of a second content item, and the method may further comprise: generating and presenting the second content item in three dimensions; while presenting the first content item and the second content item in three-dimensions using the second electronic device and concurrently displaying the two-dimensional representation of the first content item and the second content item using the first electronic device: receiving the input at the second electronic device; and in accordance with the input, updating the appearance of the first content item and the second content item in three-dimensions presented using the second electronic device and updating the appearance of the two-dimensional representation of the first content item and the second content item displayed on the first electronic device.

Additionally or alternatively, in some embodiments, the method may further comprise: establishing a communication link between the first electronic device and the second electronic device; and transmitting content item data corresponding to the first content item from the first electronic device to a three-dimensional graphic rendering application at the second electronic device via the communication link and transmitting the first content item generated in three-dimensions to the first electronic device.

Additionally or alternatively, in some embodiments, updating the appearance of the first content item in three-dimensions presented using the second electronic device and updating the appearance of the two-dimensional representation of the first content item displayed on the first electronic device may comprise: modifying the content data corresponding to the first content item in three-dimensions in accordance with the input; transmitting the modified content data corresponding to the first content item in three-dimensions from the three-dimensional graphic rendering application to the content creation application via the communication link.

Additionally or alternatively, in some embodiments, establishing the communication link may comprise: establishing a first communication link between the content creation application at the first electronic device and a preview shell application at the second electronic device; establishing a second communication link between the preview shell application and a preview agent application at the second electronic device; and establishing a third communication link between the preview agent application and the three-dimensional graphic rendering application at the second electronic device.

Additionally or alternatively, in some embodiments, transmitting content item data from the first electronic device to the three-dimensional graphic rendering application at the second electronic device may comprise: transmitting the content item data via the first communication link from the content creation application at the first electronic device to the preview shell application at the second electronic device; transmitting the content item data via the second communication link from the preview shell application to the preview agent application at the second electronic device; and transmitting the content item data via the third communication link from the preview agent application to the three-dimensional graphic rendering application at the second electronic device.

Some embodiments of the disclosure are directed a system comprising a first electronic device and a second electronic device. The system can comprise: one or more processors; memory; and one or more programs stored in the memory and configured to be executed by the one or more processors. The one or more programs can include instructions for performing any of above methods.

Some embodiments of the disclosure are directed to a non-transitory computer readable storage medium. The non-transitory computer readable storage medium may store one or more programs, the one or more programs comprising instructions, which when executed by one or more processors of a system comprising a first electronic device and a second electronic device, cause the system to perform any of the above methods.

Some embodiments of the disclosure are directed to a system comprising a first electronic device and a second electronic device. The system can further comprise: one or more processors; memory; and means for performing any of the above methods.

Some embodiments of the disclosure are directed to an information processing apparatus for use in a system comprising a first electronic device and a second electronic device. The information processing apparatus may further comprise means for performing any of the above methods.

Some embodiments of the disclosure are directed to a method of generating and updating a three-dimensional preview of content. The method can comprise: at a first electronic device in communication with a display and one or more input devices: displaying, via the display, a content creation application including a two-dimensional representation of a first content item; while displaying the content creation application including the two-dimensional representation of the first content item, receiving, via the one or more input devices, an input corresponding to a request to preview the first content item in three-dimensions; and in accordance with the input, transmitting, to a second electronic device, a request to generate a three-dimensional representation of the first content item at the second electronic device; receiving, at the first electronic device, information corresponding to the three-dimensional representation of the first content item; and updating an appearance of the two-dimensional representation of the first content item displayed at the first electronic device.

Additionally or alternatively, in some embodiments, the first electronic device may be a laptop computer, a desktop computer, or a tablet. Additionally or alternatively, in some embodiments, the second electronic device may be a head-mounted display.

Additionally or alternatively, in some embodiments, transmitting, to the second electronic device, the request to generate the three-dimensional representation of the first content item at the second electronic device may comprise: establishing a communication link between the first electronic device and the second electronic device; and transmitting content item data corresponding to the first content item from the first electronic device to a three-dimensional graphic rendering application at the second electronic device via the communication link.

Additionally or alternatively, in some embodiments, receiving, at the first electronic device, information corresponding to the three-dimensional representation of the first content item may comprise receiving modified content item data at the content creation application corresponding to the three-dimensional representation of the first content item from the three-dimensional graphic rendering application via the communication link.

Some embodiments of the disclosure are directed an electronic device. The electronic device can comprise: one or more processors; memory; and one or more programs stored in the memory and configured to be executed by the one or more processors. The one or more programs can include instructions for performing any of above methods.

Some embodiments of the disclosure are directed to a non-transitory computer readable storage medium. The non-transitory computer readable storage medium may store one or more programs, the one or more programs comprising instructions, which when executed by one or more processors of an electronic device, cause the electronic device to perform any of the above methods.

Some embodiments of the disclosure are directed to an electronic device. The electronic device can further comprise: one or more processors; memory; and means for performing any of the above methods.

Some embodiments of the disclosure are directed to an information processing apparatus for use in an electronic device. The information processing apparatus may further comprise means for performing any of the above methods.

Some embodiments of the disclosure are directed to a method of generating and updating a three-dimensional preview of content. The method can comprise: at a first electronic device in communication with a display and one or more input device: capturing, via the one or more input devices, at least a portion of a real-world environment including a second electronic device displaying a content creation application; receiving a request from the second electronic device to preview the first content item in three-dimensions; and in accordance with the request, generating a three-dimensional representation of the first content item and presenting the three-dimensional representation of the first content item within the three-dimensional environment; transmitting the three-dimensional representation of the first content item to the second electronic device for display at the second electronic device; receiving, via the one or more input devices, an input; in accordance with the input: updating an appearance of the three-dimensional representation of the first content item in the three-dimensional environment; and transmitting the updated appearance of the three-dimensional representation of the first content item to the second electronic device.

Additionally or alternatively, in some embodiments, the first electronic device may be a head-mounted display. Additionally or alternatively, in some embodiments, the second electronic device may be a laptop computer, a desktop computer, or a tablet.

Additionally or alternatively, in some embodiments, the method can further comprise presenting a representation of the captured portion of the real-world environment. The representation of the captured portion of the real-world environment can include: a representation of the second electronic device including a representation of the content creation application; and a representation of the first content item displayed in the content creation application.

Additionally or alternatively, in some embodiments, the method can further comprise capturing, via the one or more input devices, a light source of the real-world environment. Additionally or alternatively, in some embodiments, presenting the three-dimensional representation of the first content item can includes presenting a lighting effect due to interaction between the first content item and the light source, and updating the appearance of the three-dimensional representation of the first content item in the three-dimensional environment can include changing the appearance of the lighting effect.

Additionally or alternatively, in some embodiments, transmitting the updated appearance of the three-dimensional representation of the first content item to the second electronic device may not include information regarding the lighting effect.

Additionally or alternatively, in some embodiments, the input received via the one or more input devices may be an interaction with the three-dimensional representation of the first content item that includes a selection of the three-dimensional representation of the first content item using one or more fingers and/or using the one or more input devices.

Additionally or alternatively, in some embodiments, the input received via the one or more input devices may be a reorientation or a repositioning of the first electronic device within the real-world environment.

Additionally or alternatively, in some embodiments, the method can further comprise establishing a communication link between the first electronic device and the second electronic device. Additionally or alternatively, in some embodiments, receiving the request from the second electronic device to preview the first content item in three-dimensions can comprise: receiving content item data corresponding to the first content item from the second electronic device at a three-dimensional graphic rendering application at the first electronic device via the communication link. Additionally or alternatively, in some embodiments, transmitting the three-dimensional representation of the first content item to the second electronic device for display at the second electronic device can comprise: transmitting the first content item generated in three-dimensions to the second electronic device via the communication link.

Additionally or alternatively, in some embodiments, establishing the communication link can comprise: establishing a first communication link between a preview shell application at the first electronic device and the content creation application at the second electronic device; establishing a second communication link between the preview shell application and a preview agent application at the first electronic device; and establishing a third communication link between the preview agent application and the three-dimensional graphic rendering application at the first electronic device.

Additionally or alternatively, in some embodiments, receiving the content item data corresponding to the first content item from the second electronic device at the three-dimensional graphic rendering application can comprise: receiving the content item data via the first communication link from the content creation application at the second electronic device at the preview shell application at the first electronic device; transmitting the content item data via the second communication link from the preview shell application to the preview agent application at the first electronic device; and transmitting the content item data via the third communication link from the preview agent application to the three-dimensional graphic rendering application at the first electronic device.

Some embodiments of the disclosure are directed an electronic device. The electronic device can comprise: one or more processors; memory; and one or more programs stored in the memory and configured to be executed by the one or more processors. The one or more programs can include instructions for performing any of above methods.

Some embodiments of the disclosure are directed to a non-transitory computer readable storage medium. The non-transitory computer readable storage medium may store one or more programs, the one or more programs comprising instructions, which when executed by one or more processors of an electronic device, cause the electronic device to perform any of the above methods.

Some embodiments of the disclosure are directed to an electronic device. The electronic device can further comprise: one or more processors; memory; and means for performing any of the above methods.

Some embodiments of the disclosure are directed to an information processing apparatus for use in an electronic device. The information processing apparatus may further comprise means for performing any of the above methods.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method comprising:
at a first electronic device in communication with a display and one or more input devices:
displaying, via the display, a content creation application including a two-dimensional representation of a first content item;
while displaying the content creation application including the two-dimensional representation of the first content item, receiving, via the one or more input devices, an input corresponding to a request to preview the first content item in three-dimensions; and
in accordance with the input, transmitting, to a second electronic device, a request to generate a three-dimensional representation of the first content item at the second electronic device;
receiving, at the first electronic device, information corresponding to the three-dimensional representation of the first content item; and
updating an appearance of the two-dimensional representation of the first content item displayed at the first electronic device.

2. The method of claim 1, wherein the first electronic device is a laptop computer, a desktop computer, or a tablet.

3. The method of claim 1, wherein the second electronic device is a head-mounted display.

4. The method of claim 1, wherein transmitting, to the second electronic device, the request to generate the three-dimensional representation of the first content item at the second electronic device comprises:

establishing a communication link between the first electronic device and the second electronic device; and
transmitting content item data corresponding to the first content item from the first electronic device to a three-dimensional graphic rendering application at the second electronic device via the communication link.

5. The method of claim 4, wherein receiving, at the first electronic device, information corresponding to the three-dimensional representation of the first content item comprises receiving modified content item data at the content creation application corresponding to the three-dimensional representation of the first content item from the three-dimensional graphic rendering application via the communication link.

6. The method of claim 4, wherein establishing the communication link comprises:
establishing a first communication link between the content creation application and a preview shell application at the second electronic device;
wherein:
a second communication link is established between the preview shell application and a preview agent application at the second electronic device; and
a third communication link is established between the preview agent application and the three-dimensional graphic rendering application at the second electronic device.

7. The method of claim 6, wherein transmitting content item data from the first electronic device to the three-dimensional graphic rendering application at the second electronic device comprises:
transmitting the content item data via the first communication link from the content creation application at the first electronic device to the preview shell application at the second electronic device;
wherein:
the content item data is transmitted via the second communication link from the preview shell application to the preview agent application at the second electronic device; and
the content item data is transmitted via the third communication link from the preview agent application to the three-dimensional graphic rendering application at the second electronic device.

8. The method of claim 1, wherein the information corresponding to the three-dimensional representation of the first content item is received in response to an interaction with the three-dimensional representation of the first content item at the second electronic device.

9. The method of claim 1, wherein the information corresponding to the three-dimensional representation of the first content item is received in response to a reorientation of the second electronic device with respect to the three-dimensional representation of the first content item at the second electronic device.

10. An electronic device comprising:
one or more processors;
memory; and
one or more programs stored in the memory and configured to be executed by the one or more processors, the one or more programs including instructions for performing a method comprising:
displaying, via a display, a content creation application including a two-dimensional representation of a first content item;
while displaying the content creation application including the two-dimensional representation of the first content item, receiving, via one or more input devices, an input corresponding to a request to preview the first content item in three-dimensions; and in accordance with the input, transmitting, to a second electronic device, a request to generate a three-dimensional representation of the first content item at the second electronic device;

receiving, at the electronic device, information corresponding to the three-dimensional representation of the first content item; and updating an appearance of the two-dimensional representation of the first content item displayed at the electronic device.

11. The electronic device of claim 10, wherein transmitting, to the second electronic device, the request to generate the three-dimensional representation of the first content item at the second electronic device comprises:

establishing a communication link between the electronic device and the second electronic device; and transmitting content item data corresponding to the first content item from the electronic device to a three-dimensional graphic rendering application at the second electronic device via the communication link.

12. The electronic device of claim 11, wherein receiving, at the electronic device, information corresponding to the three-dimensional representation of the first content item comprises receiving modified content item data at the content creation application corresponding to the three-dimensional representation of the first content item from the three-dimensional graphic rendering application via the communication link.

13. The electronic device of claim 11, wherein establishing the communication link comprises:

establishing a first communication link between the content creation application and a preview shell application at the second electronic device;

wherein:
a second communication link is established between the preview shell application and a preview agent application at the second electronic device; and
a third communication link is established between the preview agent application and the three-dimensional graphic rendering application at the second electronic device.

14. The electronic device of claim 13, wherein transmitting content item data from the electronic device to the three-dimensional graphic rendering application at the second electronic device comprises:

transmitting the content item data via the first communication link from the content creation application at the electronic device to the preview shell application at the second electronic device;

wherein:
the content item data is transmitted via the second communication link from the preview shell application to the preview agent application at the second electronic device; and
the content item data is transmitted via the third communication link from the preview agent application to the three-dimensional graphic rendering application at the second electronic device.

15. The electronic device of claim 10, wherein the information corresponding to the three-dimensional representation of the first content item is received in response to an interaction with the three-dimensional representation of the first content item at the second electronic device.

16. A non-transitory computer readable storage medium storing one or more programs, the one or more programs comprising instructions, which when executed by one or more processors of a first electronic device, cause the first electronic device to perform a method comprising:

displaying, via a display, a content creation application including a two-dimensional representation of a first content item;

while displaying the content creation application including the two-dimensional representation of the first content item, receiving, via one or more input devices, an input corresponding to a request to preview the first content item in three-dimensions; and in accordance with the input, transmitting, to a second electronic device, a request to generate a three-dimensional representation of the first content item at the second electronic device;

receiving, at the electronic device, information corresponding to the three-dimensional representation of the first content item; and updating an appearance of the two-dimensional representation of the first content item displayed at the electronic device.

17. The non-transitory computer readable storage medium of claim 16, wherein the first electronic device is a laptop computer, a desktop computer, or a tablet.

18. The non-transitory computer readable storage medium of claim 16, wherein the second electronic device is a head-mounted display.

19. The non-transitory computer readable storage medium of claim 16, wherein transmitting, to the second electronic device, the request to generate the three-dimensional representation of the first content item at the second electronic device comprises:

establishing a communication link between the first electronic device and the second electronic device; and transmitting content item data corresponding to the first content item from the first electronic device to a three-dimensional graphic rendering application at the second electronic device via the communication link.

20. The non-transitory computer readable storage medium of claim 19, wherein receiving, at the first electronic device, information corresponding to the three-dimensional representation of the first content item comprises receiving modified content item data at the content creation application corresponding to the three-dimensional representation of the first content item from the three-dimensional graphic rendering application via the communication link.

* * * * *